(12) United States Patent
Patil et al.

(10) Patent No.: US 12,382,456 B2
(45) Date of Patent: Aug. 5, 2025

(54) HIGH FREQUENCY MULTI-LINK SUPPORT SYSTEMS OPERATION

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US); Gaurang Naik, San Diego, CA (US); Yanjun Sun, San Diego, CA (US); Sai Yiu Duncan Ho, San Diego, CA (US); Abdel Karim Ajami, Lakeside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 17/853,668

(22) Filed: Jun. 29, 2022

(65) Prior Publication Data
US 2024/0008039 A1    Jan. 4, 2024

(51) Int. Cl.
*H04W 72/20*    (2023.01)
*H04W 16/28*    (2009.01)
(Continued)

(52) U.S. Cl.
CPC .......... *H04W 72/20* (2023.01); *H04W 16/28* (2013.01); *H04W 56/004* (2013.01); *H04W 76/15* (2018.02)

(58) Field of Classification Search
None
See application file for complete search history.

(56) References Cited

U.S. PATENT DOCUMENTS

2021/0014911 A1    1/2021    Patil et al.
2021/0144698 A1*   5/2021    Kwon ................... H04W 76/14
(Continued)

OTHER PUBLICATIONS 802 11 Working Group of the LAN/MAN Standards Committee of the IEEE Computer Society: "Draft Standard for Information Technology-Tele-Communications and Information Exchange between Systems Local and Metropolitan Area Networks-Specific Requirements?? Part 11: Wireless LAN Medium Access Control? (MAC) and Physical Layer (PHY) Specifications?? Amendment 8: Enhancements for Extre", Draft P802.11BE_D1.6, IEEE-SA, Piscataway, NJ, USA, vol. 802.11be drafts, No. D1.6, May 17, 2022, pp. 1-887, XP068192087.

(Continued)

*Primary Examiner* — Minh Trang T Nguyen
(74) *Attorney, Agent, or Firm* — Holland & Hart LLP/Qualcomm

(57) ABSTRACT

This disclosure provides systems, methods and apparatus, including computer programs encoded on computer storage media, for high frequency multi-link support systems operation. In some aspects, an access point (AP) multi-link device (MLD) and a non-AP MLD may use a first radio frequency link to support and facilitate communications using a second radio frequency link, where such a second radio frequency link may otherwise be associated with access constraints or difficulties. For example, the first radio frequency link may be a sub-7 gigahertz (GHz) link and the second radio frequency link may be a 3.5 GHz, 45 GHz, or 60 GHz link. The AP MLD may transmit, to the non-AP MLD via the first radio frequency link, identifying and control information associated with the second radio frequency link. The non-AP MLD and the AP MLD may use the identifying and control information to communicate data via the second radio frequency link.

30 Claims, 11 Drawing Sheets

(51) Int. Cl.
*H04W 56/00* (2009.01)
*H04W 76/15* (2018.01)

(56) References Cited

U.S. PATENT DOCUMENTS

2021/0250848 A1* 8/2021 Seok ................ H04W 48/16
2024/0388959 A1   11/2024 Frederiks et al.

OTHER PUBLICATIONS

Chitrakar (Panasonic) R., "Multi-Link Setup Clarifications", IEEE Draft, 11-20-0751-01-00BE-MULTI-LINK-SETUP-CLARIFICATIONS, IEEE-SA, Mentor, Piscataway, NJ, USA, vol. 802.11 EHT, 802.11be, No. 1, Jul. 21, 2020 (Jul. 21, 2020), pp. 1-18, XP068170148, p. 2-p. 3, p. 5-p. 7, p. 9, p. 11-p. 12.
International Search Report and Written Opinion—PCT/US2023/066250—ISA/EPO—Jul. 20, 2023 (2205503WO).
He Y., et al., "NATALIE: An Adaptive, Network-Aware Traffic Equalizer", Proceedings of the 2007 IEEE International Conference on Communications (ICC 2007), Jun. 24-28, 2007, Glasgow, UK, IEEE, Piscataway, NJ, USA, Jun. 1, 2007, pp. 595-602, XP031125736, abstract, sections I-V.

\* cited by examiner

HIGH FREQUENCY MULTI-LINK SUPPORT SYSTEMS OPERATION

TECHNICAL FIELD

This disclosure relates to wireless communications, including high frequency multi-link support systems operation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless local area network (WLAN), such as a wireless fidelity (Wi-Fi) or Institute of Electrical and Electronics Engineers (IEEE) 802.11 network, may include an access point (AP) that may communicate with one or more stations (STAs), client devices, or mobile devices. The AP may be coupled with a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a first multi-link device (MLD). The method may include receiving, via a first radio frequency link, identifying information associated with a second radio frequency link in accordance with a multi-link operation between the first MLD and a second MLD, receiving, via the first radio frequency link, control information associated with communications using the second radio frequency link, where the communications using the second radio frequency link are associated with a configuration for directional transmissions between the first MLD and the second MLD, and communicating, with the second MLD via the second radio frequency link, one or more data messages in accordance with the control information.

Another innovative aspect of the subject matter described in this disclosure can be implemented in an apparatus for wireless communications at a first MLD. The apparatus may include one or more interfaces and a processing system. The one or more interfaces may be configured to obtain, via a first radio frequency link, identifying information associated with a second radio frequency link in accordance with a multi-link operation between the first MLD and a second MLD and obtain, via the first radio frequency link, control information associated with communications using the second radio frequency link, where the communications using the second radio frequency link are associated with a configuration for directional transmissions between the first MLD and the second MLD. The one or more interfaces may be configured to output, to the second MLD via the second radio frequency link, one or more data messages in accordance with the control information.

Another innovative aspect of the subject matter described in this disclosure can be implemented in an apparatus for wireless communications at a first MLD. The apparatus may include a processor, memory coupled with the processor, and instructions stored in the memory. The instructions may be executable by the processor to cause the apparatus to receive, via a first radio frequency link, identifying information associated with a second radio frequency link in accordance with a multi-link operation between the first MLD and a second MLD, receive, via the first radio frequency link, control information associated with communications using the second radio frequency link, where the communications using the second radio frequency link are associated with a configuration for directional transmissions between the first MLD and the second MLD, and communicate, with the second MLD via the second radio frequency link, one or more data messages in accordance with the control information.

Another innovative aspect of the subject matter described in this disclosure can be implemented in another apparatus for wireless communications at a first MLD. The apparatus may include means for receiving, via a first radio frequency link, identifying information associated with a second radio frequency link in accordance with a multi-link operation between the first MLD and a second MLD, means for receiving, via the first radio frequency link, control information associated with communications using the second radio frequency link, where the communications using the second radio frequency link are associated with a configuration for directional transmissions between the first MLD and the second MLD, and means for communicating, with the second MLD via the second radio frequency link, one or more data messages in accordance with the control information.

Another innovative aspect of the subject matter described in this disclosure can be implemented in a non-transitory computer-readable medium storing code for wireless communications at a first MLD. The code may include instructions executable by a processor to receive, via a first radio frequency link, identifying information associated with a second radio frequency link in accordance with a multi-link operation between the first MLD and a second MLD, receive, via the first radio frequency link, control information associated with communications using the second radio frequency link, where the communications using the second radio frequency link are associated with a configuration for directional transmissions between the first MLD and the second MLD, and communicate, with the second MLD via the second radio frequency link, one or more data messages in accordance with the control information.

In some implementations of the method, apparatuses, and non-transitory computer-readable medium described herein, receiving the identifying information associated with the second radio frequency link may include operations, features, means, or instructions for receiving, via a reduced neighbor report (RNR) element carried in a beacon frame or a probe response frame associated with the first radio frequency link, an indication of a restriction associated with use of the second radio frequency link and receiving, via a multi-link probe response, an indication of a condition associated with the use of the second radio frequency link, where a setup of the second radio frequency link may be associated with a satisfaction of the condition.

Some implementations of the method, apparatuses, and non-transitory computer-readable medium described herein may further include operations, features, means, or instructions for receiving, via the first radio frequency link, a first multi-link reconfiguration message associated with an addition of the second radio frequency link to a multi-link setup between the first MLD and the second MLD in accordance with the satisfaction of the condition and receiving, via the first radio frequency link or the second radio frequency link, a second multi-link reconfiguration message associated with a removal of the second radio frequency link from the multi-link setup between the first MLD and the second MLD in accordance with the condition no longer being satisfied.

In some implementations of the method, apparatuses, and non-transitory computer-readable medium described herein, the addition of the second radio frequency link and the removal of the second radio frequency link may be specific to the first MLD.

One innovative aspect of the subject matter described in this disclosure can be implemented in a method for wireless communications at a first MLD. The method may include transmitting, via a first radio frequency link, identifying information associated with a second radio frequency link in accordance with a multi-link operation between a second MLD and the first MLD, transmitting, via the first radio frequency link, control information associated with communications using the second radio frequency link, where the communications using the second radio frequency link are associated with a configuration for directional transmissions between the first MLD and the second MLD, and communicating, with the second MLD via the second radio frequency link, one or more data messages in accordance with the control information.

Another innovative aspect of the subject matter described in this disclosure can be implemented in an apparatus for wireless communications at a first MLD. The apparatus may include one or more interfaces and a processing system. The one or more interfaces may be configured to output, via a first radio frequency link, identifying information associated with a second radio frequency link in accordance with a multi-link operation between a second MLD and the first MLD and output, via the first radio frequency link, control information associated with communications using the second radio frequency link, where the communications using the second radio frequency link are associated with a configuration for directional transmissions between the first MLD and the second MLD. The one or more interfaces may be configured to obtain, from the second MLD via the second radio frequency link, one or more data messages in accordance with the control information.

Another innovative aspect of the subject matter described in this disclosure can be implemented in an apparatus for wireless communications at a first MLD. The apparatus may include a processor, memory coupled with the processor, and instructions stored in the memory. The instructions may be executable by the processor to cause the apparatus to transmit, via a first radio frequency link, identifying information associated with a second radio frequency link in accordance with a multi-link operation between a second MLD and the first MLD, transmit, via the first radio frequency link, control information associated with communications using the second radio frequency link, where the communications using the second radio frequency link are associated with a configuration for directional transmissions between the first MLD and the second MLD, and communicate, with the second MLD via the second radio frequency link, one or more data messages in accordance with the control information.

Another innovative aspect of the subject matter described in this disclosure can be implemented in another apparatus for wireless communications at a first MLD. The apparatus may include means for transmitting, via a first radio frequency link, identifying information associated with a second radio frequency link in accordance with a multi-link operation between a second MLD and the first MLD, means for transmitting, via the first radio frequency link, control information associated with communications using the second radio frequency link, where the communications using the second radio frequency link are associated with a configuration for directional transmissions between the first MLD and the second MLD, and means for communicating, with the second MLD via the second radio frequency link, one or more data messages in accordance with the control information.

Another innovative aspect of the subject matter described in this disclosure can be implemented in a non-transitory computer-readable medium storing code for wireless communications at a first MLD. The code may include instructions executable by a processor to transmit, via a first radio frequency link, identifying information associated with a second radio frequency link in accordance with a multi-link operation between a second MLD and the first MLD, transmit, via the first radio frequency link, control information associated with communications using the second radio frequency link, where the communications using the second radio frequency link are associated with a configuration for directional transmissions between the first MLD and the second MLD, and communicate, with the second MLD via the second radio frequency link, one or more data messages in accordance with the control information.

In some implementations of the method, apparatuses, and non-transitory computer-readable medium described herein, transmitting the identifying information associated with the second radio frequency link may include operations, features, means, or instructions for transmitting, via an RNR element carried in a beacon frame or a probe response frame associated with the first radio frequency link, an indication of a restriction associated with use of the second radio frequency link and transmitting, via a multi-link probe response, an indication of a condition associated with the use of the second radio frequency link, where a setup of the second radio frequency link may be associated with a satisfaction of the condition.

Some implementations of the method, apparatuses, and non-transitory computer-readable medium described herein may further include operations, features, means, or instructions for transmitting, via the first radio frequency link, a first multi-link reconfiguration message associated with an addition of the second radio frequency link to a multi-link setup between the second MLD and the first MLD in accordance with the satisfaction of the condition and transmitting, via the first radio frequency link or the second radio frequency link, a second multi-link reconfiguration message associated with a removal of the second radio frequency link from the multi-link setup between the second MLD and the first MLD in accordance with the condition no longer being satisfied.

In some implementations of the method, apparatuses, and non-transitory computer-readable medium described herein, the addition of the second radio frequency link and the removal of the second radio frequency link may be specific to the second MLD.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
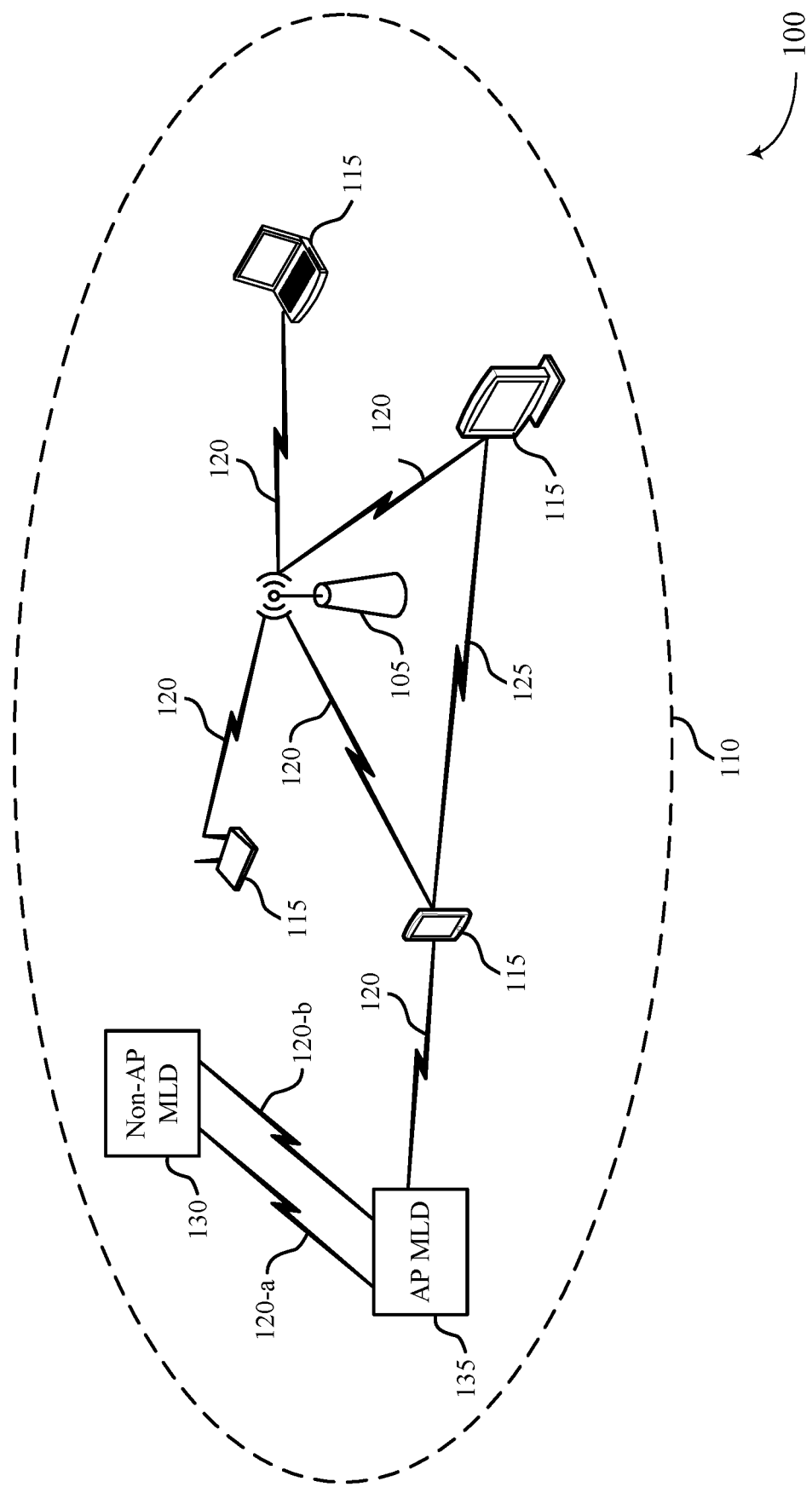
FIG. 1 shows an example wireless communications system that supports high frequency multi-link support systems operation.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving RF signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

In some deployments, devices (such as wireless fidelity (Wi-Fi) devices) may support multi-link operation (MLO) according to which the devices may communicate via multiple different links. For example, an access point (AP) multi-link device (MLD) may communicate with a non-AP MLD via a 2.4 gigahertz (GHz) link, a 5 GHz link, a 6 GHz link, or any combination thereof. In some systems, an AP MLD and a non-AP MLD may be capable of communication via other radio frequency links, such as 3.5 GHz, 45 GHz, or 60 GHz links, which may provide relatively higher data rates, a cleaner (such as less crowded) operating channel, or greater link diversity. Communication over such other radio frequency links may present several challenges or be associated with one or more access constraints, which may hinder adoption of such other radio frequency links (which may, in turn, limit an achievable throughput or diversity of a system). For example, communication via the 45 GHz and 60 GHz links may be relatively more susceptible to propagation losses and access to the 3.5 GHz link may be limited (such as due to incumbent technologies that have priority access) or associated with one or more rules. Further, while communicating data using a 3.5 GHz, 45 GHz, or 60 GHz link may increase overall system capacity, other signaling (such as discovery information, control information, or signaling associated with beam training procedures) may be less well-suited for such radio frequencies due to their respective constraints or challenges.

In some implementations, a non-AP MLD and an AP MLD may support communication via a radio frequency link associated with access constraints or difficulties (such as a 3.5 GHz link, a 45 GHz link, or a 60 GHz link) by leveraging a different radio frequency link (such as a 2.4 GHz link, a 5 GHz link, or a 6 GHz link). In other words, the non-AP MLD and the AP MLD may use a first radio frequency link (such as a 2.4 GHz link, a 5 GHz link, or a 6 GHz link) as an anchor link to facilitate operations on a second radio frequency link (such as a 3.5 GHz link, a 45 GHz link, or a 60 GHz link). For example, a non-AP MLD may monitor the first radio frequency link for identifying information associated with the second radio frequency link and may use the first radio frequency link to communicate control and feedback information associated with data messages sent (or to be sent) via the second radio frequency link. The non-AP MLD may receive the identifying information associated with the second radio frequency link via a reduced neighbor report (RNR) element carried in a beacon frame or a probe response frame sent via the first radio frequency link or via a multi-link probe response sent via the first radio frequency link. Further, in some implementations, a non-AP MLD may conditionally communicate via the second radio frequency link. In such implementations, the RNR element or the multi-link probe response may indicate a restriction associated with use of the second radio frequency link and, if a condition is satisfied, the non-AP MLD and the AP MLD may exchange multi-link setup signaling to add the second radio frequency link. Additionally, or alternatively, the non-AP MLD and the AP MLD may support one or more signaling- or configuration-based mechanisms associated with transmission of beacon frames via the second radio frequency link. In some implementations, for example, the non-AP MLD and the AP MLD may support a selective or conditional transmission of beacon frames via the second radio frequency link and may otherwise use beacon frames sent via the first radio frequency link to transmit and receive information associated with operational parameters of the second radio frequency link.

Particular implementations of the subject matter described in this disclosure can be implemented to realize one or more of the following potential advantages. For example, as a result of utilizing a 2.4 GHz, 5 GHz, or 6 GHz anchor link to facilitate communication via any one or more of a 3.5 GHz, 45 GHz, or 60 GHz link, a non-AP MLD and an AP MLD may more reliably access and maintain the 3.5 GHz, 45 GHz, or 60 GHz link while achieving relatively low overhead on the 3.5 GHz, 45 GHz, or 60 GHz link. As such, the non-AP MLD and the AP MLD may achieve the higher data rates and greater system capacity associated with usage of additional links while maintaining or increasing spectral efficiency and link reliability. For example, in accordance with establishing and maintaining more radio frequency links, a transmitter may duplicate a packet over multiple links, which may increase reliability of communications between the transmitter and a receiver and reduce latency (as there may be more links available to service, such as send or transmit, data). Additionally, the 3.5 GHz, 45 GHz, or 60 GHz link may be associated with a relatively clearer (such as less congested) channel with potentially less contention for access and a lower likelihood of signaling collisions, which may further increase throughput and reduce latency. Further, the non-AP MLD and the AP MLD may spend less battery power on signaling overhead, which may improve power savings and increase a battery life (or lessen a power draw) at each device.

FIG. 1 shows an example wireless communications system 100 that supports high frequency multi-link support systems operation. The wireless communications system 100 may be an example of a wireless local area network (WLAN) or a Wi-Fi network and may include an AP 105 and multiple associated STAs 115, which may represent devices such as mobile stations, personal digital assistant (PDAs), other handheld devices, netbooks, notebook computers, tablet computers, laptops, display devices (such as TVs or computer monitors), or printers. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a BSA of the wireless communications system 100. An extended network station (not shown) associated with the wireless communications system 100 may be connected to a wired or wireless distribution system that may allow multiple APs 105 to be connected in an ESS.

A STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some implementations, the coverage area 110 of an AP 105 may be divided into sectors (also not shown). The wireless communications system 100 may include APs 105 of different types (such as metropolitan area, or home network), with varying and overlapping coverage areas 110. Two STAs 115 also may communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, or 802.11be. In some other implementations, peer-to-peer (P2P) connections or ad hoc networks may be implemented within wireless communications system 100.

In some implementations, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment, such as a carrier-sense multiple access with collision avoidance (CSMA/CA) environment, because the STAs 115 may transmit at the same time. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some implementations, the wireless communications system 100 may support MLO according to which two or more devices may communicate via two or more wireless links, such as two or more radio frequency links. MLO may refer or apply to pre-association or post-association operation. In such implementations, the wireless communications system 100 may include one or more MLDs that are capable of communicating (such as transmitting or receiving) via multiple links. In some aspects, one or more STAs 115 may be associated or affiliated with a first MLD, such as a non-AP MLD 130, and one or more APs 105 may be associated or affiliated with a second MLD, such as an AP MLD 135. The one or more STAs 115 or APs 105 affiliated with an MLD may be associated with multiple functionalities of the MLD.

For example, an MLD may be a device that is capable of communicating via multiple radio frequency links and operation or functionality of the MLD at each of the multiple radio frequency links may be described as being performed by a respective STA 115 (in examples in which the MLD is a non-AP MLD 130, such that each STA 115 affiliated with a non-AP MLD 130 is a non-AP STA 115) or a respective AP 105 (in examples in which the MLD is an AP MLD 135, such that each STA 115 affiliated with an AP MLD 135 is or functions as an AP 105). As such, a non-AP MLD 130 may communicate (such as transmit or receive, or both) via a first radio frequency link using a first STA 115 and may communicate (such as transmit or receive, or both) via a second radio frequency link using a second STA 115. Similarly, an AP MLD 135 may communicate (such as transmit or receive, or both) via a first radio frequency link using a first AP 105 and may communicate (such as transmit or receive, or both) via a second radio frequency link using a second AP 105. For example, a non-AP MLD 130 may effectively communicate with an AP MLD 135 via a wireless link 120-*a* using a first STA-AP pair and via a wireless link 120-*b* using a second STA-AP pair.

A non-AP MLD 130 and an AP MLD 135 may communicate via various radio frequency links, including a 2.4 GHz link, a 5 GHz link, and a 6 GHz link. In some systems, the 2.4 GHz link, the 5 GHz link, and the 6 GHz link may be relatively easy to access. For example, a non-AP MLD 130 and an AP MLD 135 may access or communicate using (such as transmit or receive via) any one or more of the 2.4 GHz link, the 5 GHz link, and the 6 GHz link without negotiating access on a different link, without an access constraint (such as an access constraint associated with a service type), or without applying techniques associated with mitigating propagation path loss (such as focusing transmission and reception in a specific direction via beamforming). Some other radio frequency links, however, may be associated with an access constraint or difficulty and, in some implementations, a non-AP MLD 130 and an AP MLD 135 may use any one or more of the 2.4 GHz link, the 5 GHz link, and the 6 GHz link to support and facilitate communications via such other radio frequency links.

Such other radio frequency links may include a 3.5 GHz link, a 45 GHz link, or a 60 GHz link. An access constraint of the 3.5 GHz link, for example, may be associated with other devices (such as incumbent devices) already having access and priority to the 3.5 GHz link. For example, some military and commercial equipment may operate via the 3.5 GHz link and such equipment may have a priority to the 3.5 GHz link. As such, while some Wi-Fi devices or other wireless devices may be permitted to use the 3.5 GHz link, such devices may be configured or indicated to turn off or back off when an incumbent device is transmitting. Accordingly, discovery, setup, and coordination exchanges for a potentially deprioritized device using the 3.5 GHz link may be impractical (as they may be interrupted or precluded from transmission relatively often). An access constraint of the 45 GHz link or the 60 GHz link may be associated with characteristics and challenges associated with communication at relatively higher radio frequencies. For example, the 45 GHz link and the 60 GHz link may be associated with reachability issues (due to relatively high propagation path loss) and a use of beamforming (such as highly focused transmissions) to achieve a suitable signal quality. Such reachability issues and use of beamforming may make discovery, setup, and coordination exchanges using the 45 GHz link or the 60 GHz link impractical as well, as the reachability issues and the use of beamforming may cause communicating devices to transmit or receive a relatively large amount of overhead signaling or experience link failure relatively often, or both.

In some implementations, a non-AP MLD 130 and an AP MLD 135 may support and facilitate communications using a radio frequency link associated with an access constraint or difficulty (such as a 3.5 GHz link, a 45 GHz link, or a 60 GHz link) in accordance with exchanging signaling via any one or more radio frequency links that are relatively easy to access (such as any one or more of a 2.4 GHz link, a 5 GHz link, or a 6 GHz link). As described herein, such one or more radio frequency links that are relatively easy to access (such as any one or more of the 2.4 GHz link, the 5 GHz link, or the 6 GHz link) may be referred to as a first radio frequency link and any one or more radio frequency links that are associated with an access constraint or difficulty (such as any one or more of the 3.5 GHz link, the 45 GHz link, or the 60 GHz link) may be referred to as a second radio frequency link. In some implementations, the AP MLD 135 may transmit, to the non-AP MLD 130 via the first radio frequency link, identifying information (such as discovery information, basic discovery information, advertisement information, association information, authentication information, access constraint information, or any combination thereof) and control information (such as service period (SP) information, scheduling information, timing information, feedback information, or any combination thereof) associated with the second radio frequency link. The non-AP MLD 130 and the AP MLD 135 may communicate (such as transmit or receive) data messages via the second radio frequency link in accordance with the identifying information and the control information.

In some aspects, the first radio frequency link (such as any one or more of the 2.4 GHz link, the 5 GHz link, or the 6 GHz link) may be referred to as a sub-7 GHz link, where a sub-7 GHz link may generally refer to any radio frequency link, or any collection of two or more radio frequency links, at or below 7 GHz. Further, as described herein, the second radio frequency link may refer to any radio frequency link associated with an access constraint or difficulty. Thus, the implementations described herein may be applicable to any radio frequency band or link that has constraints or rules in terms of which devices may obtain access, when devices may obtain access, or how far (in terms of a reachability distance) messaging can be transmitted via that radio frequency band or link.

Further, the devices of the wireless communications system 100 may support various possible configurations associated with operation at one or more radio frequencies (such as possible configurations for 45 GHz or 60 GHz operation). For example, depending on a radio configuration, a device (such as an AP 105, a STA 115, a non-AP MLD 130, or an AP MLD 135) may operate in accordance with a single link, single radio (SLSR) configuration according to which a single radio device may operate using one radio frequency, a multi-link, single radio (MLSR) configuration according to which a device may operate using one radio frequency band at a time (but may operate using both sub-7 GHz and 45 GHz or 60 GHz), or a multi-link, multi-radio (MLMR) configuration according to which a device may operate on more than one band simultaneously (with at least one radio operating using a sub-7 GHz band). In accordance with the implementations described herein, an MLD may support an MLSR or an MLMR configuration. As such, the described techniques may apply for devices that can communicate via multiple links simultaneously or devices that can communicate via different links at different times.

Further, although described herein as a non-AP MLD 130, a non-AP MLD 130 may function as a soft AP device (which may be referred to as a softAP device). In such examples in which the non-AP MLD 130 functions as a soft AP device, the non-AP MLD 130 may perform the same or similar functions (such as transmit or receive the same or similar signaling) as the AP MLD 135 to one or more other STAs 115 or to one or more other non-AP MLDs 130. If operating as a soft AP device, which may be a device that operates using a battery or an otherwise limited power supply (or in a power save mode), the non-AP MLD 130 may use a same set of radio frequency chains for soft AP device operation as used for operation as a non-AP MLD 130. Further, although referred to herein as a soft AP device, such a device may be any client device (such as any battery powered client device) that functions as an AP MLD 135.

Figure 2:
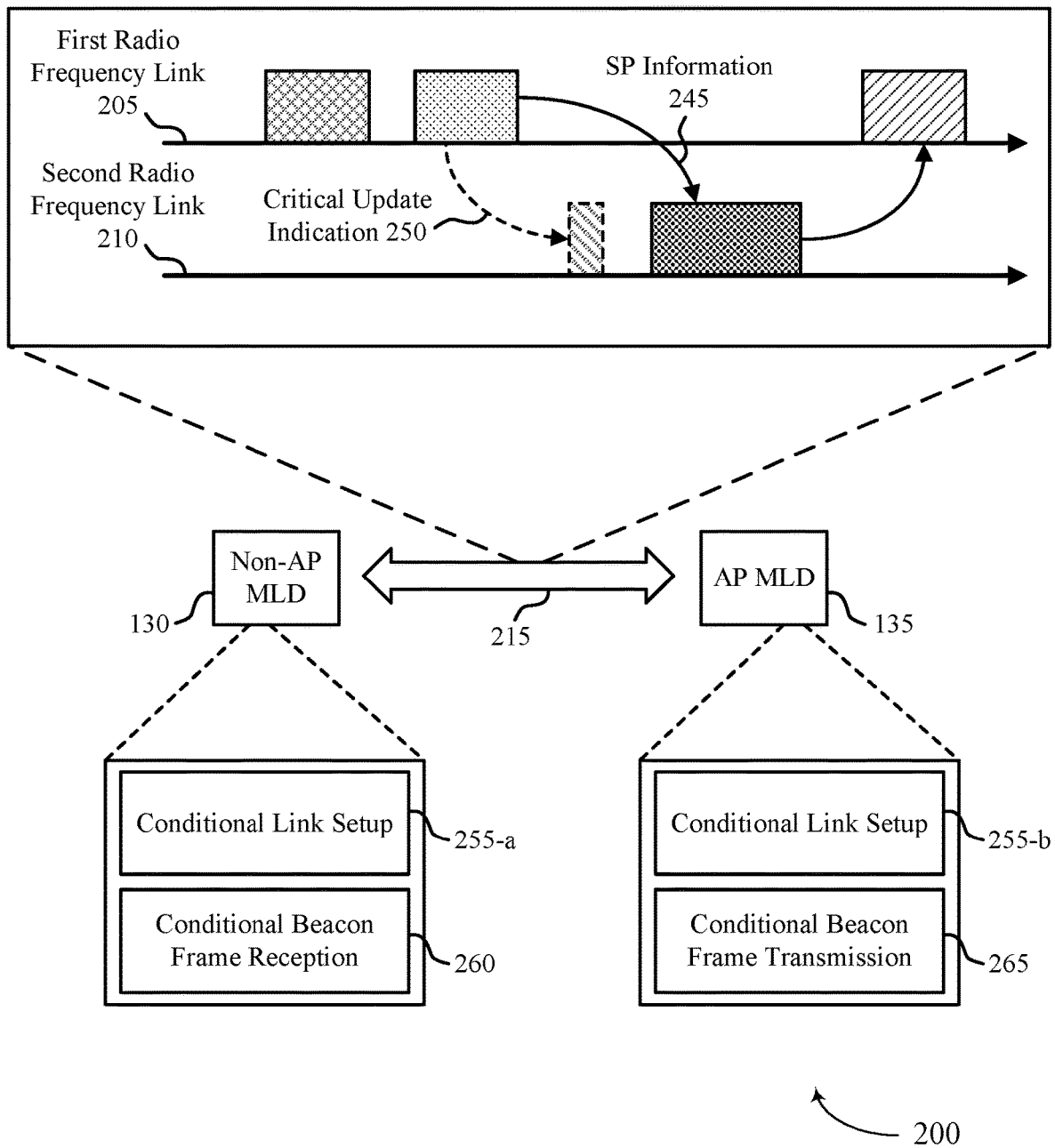
FIG. 2 shows an example signaling diagram that supports high frequency multi-link support systems operation.

FIG. 2 shows an example signaling diagram 200 that supports high frequency multi-link support systems operation. The signaling diagram 200 may implement or be implemented to realize aspects of the wireless communications system 100. For example, the signaling diagram 200 illustrates communication between a non-AP MLD 130 and an AP MLD 135, which may be examples of the non-AP MLD 130 and the AP MLD 135, respectively, as illustrated by and described with reference to FIG. 1. In some implementations, the non-AP MLD 130 and the AP MLD 135 may communicate via a communication link 215, which may refer to or include one or multiple different links, and may use signaling mechanisms and frame exchanges via a first radio frequency link 205 (such as any one or more of a 2.4 GHz link, a 5 GHz link, or a 6 GHz link) to support communication via a second radio frequency link 210 (such as any one or more of a 3.5 GHz link, a 45 GHz link, or a 60 GHz link).

Some radio frequency bands (such as a 3.5 GHz, 45 GHz, or 60 GHz band) may provide a large amount of communication resources (such as a large swath of spectrum) that communicating devices (such as Wi-Fi devices) may use. Operation on relatively higher radio frequency bands (such as 45 GHz or 60 GHz bands) may present several challenges at a device or system level (such as challenges resulting from relatively greater propagation loss) and some systems may define communication procedures associated with overcoming the challenges. Several challenges or complications may still arise, however, which has led to a lack of widespread adoption of the 45 GHz or 60 GHz band for data communications. To further address the challenges presented by 45 GHz or 60 GHz band operation, as well as access constraints associated with 3.5 GHz band operation, some systems may leverage MLO to make 3.5 GHz, 45 GHz, or 60 GHz operation more seamless and accessible, which may facilitate greater adoption of such bands and, likewise, increase data rates and system capacity.

Accordingly, in some implementations, the non-AP MLD 130 and the AP MLD 135 may utilize or leverage an MLO framework to facilitate operations and communications using the second radio frequency link 210. For example, the non-AP MLD 130 and the AP MLD 135 may include a second radio frequency link 210 as part of an MLO setup involving at least one first radio frequency link 205 (such as at least one sub-7 GHz link). In other words, the non-AP MLD 130 and the AP MLD 135 may use the first radio frequency link 205 to setup operations involving the second radio frequency link 210. Such an MLO setup may include the transmission or reception of one or more management frames via a first radio frequency link 205 that include information associated with the second radio frequency link 210. As such, the non-AP MLD 130 and the AP MLD 135 may reduce management overhead associated with the second radio frequency link 210 in accordance with moving management frame exchanges to the first radio frequency link 205.

For example, the AP MLD 135 may transmit, to the non-AP MLD 130 via the first radio frequency link 205, identifying information 220 associated with the second radio frequency link 210. As such (for MLSR or MLMR configurations), discovery of the second radio frequency link 210 may occur via the first radio frequency link 205 and, in some implementations, the non-AP MLD 130 and the AP MLD 135 may perform association (such as exchange one or more association frames associated with the second radio frequency link 210) via on-channel tunneling (OCT) via the first radio frequency link 205. In some aspects, the non-AP MLD 130 may continuously use (such as park on) the second radio frequency link 210 throughout a duration of an association procedure and may perform operations (exclusively) on the second radio frequency link 210. In such aspects, the non-AP MLD 130 and the AP MLD 135 may setup SPs via frame exchanges on the first radio frequency link 205 and may move to the second radio frequency link 210 for a remainder of the duration of the association procedure. In some other aspects, the non-AP MLD 130 may setup SPs for the second radio frequency link 210 and may switch a radio (such as a single radio if the non-AP MLD 130 is in an MLSR configuration) between the first radio frequency link 205 and the second radio frequency link 210. In other words, the non-AP MLD 130 may adjust a radio frequency chain to switch between communicating (such as transmitting, receiving, or monitoring) using the first radio frequency link 205 and the second radio frequency link 210.

The AP MLD 135 may transmit the identifying information 220 via any one or more of a probe response frame, a multi-link probe response, an association frame, or a beacon frame (such as an RNR element in a beacon frame or a probe response frame). For example, if a 60 GHz AP 105 is affiliated with the AP MLD 135 along with at least one other sub-7 GHz AP 105, the AP MLD 135 may transmit, via the first radio frequency link 205, an RNR element or a multi-link probe response that provides the identifying information 220 of the 60 GHz AP 105. Further, association frames exchanged between the non-AP MLD 130 and the AP MLD 135 via the first radio frequency link 205 may include information associated with or otherwise indicating the second radio frequency link 210 as part of a multi-link setup (where a multi-link setup may refer to multi-link association).

In some implementations, the second radio frequency link 210 may be subject to or otherwise associated with a restriction (such as a constraint or condition). For example, in some deployments, the second radio frequency link 210 may be excluded as part of a multi-link setup and use of the second radio frequency link 210 may be allowed if a condition is satisfied. In such implementations, the identifying information 220 associated with the second radio frequency link 210 may include an indication of such a restriction. In some aspects, the AP MLD 135 may indicate such a restriction via one or more of an RNR element of a beacon frame, a probe response frame, or a multi-link probe response. For example, the AP MLD 135 may include a field or bit in an RNR element in a beacon frame or a probe response frame to indicate the restriction (such as a presence, applicability, or activation of the restriction) and may include one or more fields in a multi-link probe response to indicate a condition or criteria to be met to lift the restriction (and enable or allow use of the second radio frequency link 210).

Such a condition or criteria may be associated with payment by a user of the non-AP MLD 130, a geographic location of the non-AP MLD 130 or the AP MLD 135, a proximity of the non-AP MLD 130 to the AP MLD 135, or an application running at one or both of the non-AP MLD 130 or the AP MLD 135. Accordingly, the condition or criteria may be satisfied if payment is made (which may be indicated from the non-AP MLD 130 to the AP MLD 135), if the non-AP MLD 130 and the AP MLD 135 are located within a specific geographic location, or if the non-AP MLD 130 is within a threshold distance from the AP MLD 135. If the condition associated with the second radio frequency link 210 is satisfied, the non-AP MLD 130 and the AP MLD 135 may add the second radio frequency link 210 to an existing or current multi-link setup (such as a multi-link setup that is already established) via a reconfiguration add operation. The non-AP MLD 130 may perform a conditional link setup 255-*a* and the AP MLD 135 may perform a conditional link setup 255-*b* in accordance with whether the condition is satisfied, where a conditional link setup 255 (which may generally refer to one or both of the conditional link setup 255-*a* and the conditional link setup 255-*b*) may trigger a signaling exchange between the non-AP MLD 130 and the AP MLD 135 associated with a multi-link setup to add the second radio frequency link 210.

For example, the AP MLD 135 may transmit a first multi-link reconfiguration message associated with an addition of the second radio frequency link 210 to the multi-link setup between the non-AP MLD 130 and the AP MLD 135 in accordance with a satisfaction of the condition. In some scenarios, the condition may be satisfied for a finite time period and, in accordance with the condition no longer being satisfied, the AP MLD 135 may transmit a second multi-link reconfiguration message associated with a removal of the second radio frequency link 210 from the multi-link setup between the non-AP MLD 130 and the AP MLD 135. For example, when the second radio frequency link 210 is to be removed from the existing or current multi-link setup, the non-AP MLD 130 and the AP MLD 135 may perform a multi-link reconfiguration delete operation. In some aspects, the condition no longer being satisfied may correspond to an expiration of a specific amount of time (such as a specific amount of time paid for by a user of the non-AP MLD 130), the non-AP MLD 130 or the AP MLD 135 no longer being located within a specific geographic location, a distance between the non-AP MLD 130 and the AP MLD 135 exceeding a threshold distance, or a specific application no longer being run at one or both of the non-AP MLD 130 or the AP MLD 135.

In some implementations, the non-AP MLD 130 and the AP MLD 135 may add the second radio frequency link 210 to the existing or current multi-link setup and remove the second radio frequency link 210 from the existing or current multi-link setup via a one-to-one add operation and a one-to-one delete operation, respectively. In other words, instead of adding or removing the second radio frequency link 210 on a global basis (such that all served non-AP MLDs 130 or all served STAs 115 add or remove the second radio frequency link 210), the AP MLD 135 may add or remove the second radio frequency link 210 for one or more specific non-AP MLDs 130 or one or more specific STAs 115. Further, in accordance with adding or removing the second radio frequency link 210 via a one-to-one multi-link reconfiguration add operation or a one-to-one multi-link reconfiguration delete operation, respectively, the non-AP MLD 130 and the AP MLD 135 may add or remove the second radio frequency link 210 without performing a complete reconfiguration or teardown of other established links. As such, the non-AP MLD 130 and the AP MLD 135 may add or remove the second radio frequency link 210 while maintaining information (such as operational parameters or beamforming information) associated with any other links supported by the existing or current multi-link setup (such as the first radio frequency link 205).

In some implementations, the non-AP MLD 130 may monitor the first radio frequency link 205 for control information 225 associated with the second radio frequency link 210. The non-AP MLD 130 may receive the control information 225 from the AP MLD 135 via the first radio frequency link 205 via one or more management frames (such as one or more beacon frames, one or more multi-link probe responses, one or more probe response frames, one or more (re)association response frames, or one or more other management-type frames). The control information 225 may include at least one of a duration of a beacon interval (BI) associated with the second radio frequency link 210, timing information associated with the second radio frequency link 210, a traffic indication or a traffic identifier (TID) associated with the second radio frequency link 210, SP information 245 of the second radio frequency link 210, an indication of an update (such as a critical update indication 250) to one or more operational parameters associated with the second radio frequency link 210, or a set of operational parameters associated with the second radio frequency link 210, or any combination thereof.

In some aspects, the timing information associated with the second radio frequency link 210 may include information associated with a timing synchronization function (TSF) of the second radio frequency link 210, which may be indicated via a time offset between a TSF of the first radio frequency link 205 and the TSF of the second radio frequency link 210. For example, the non-AP MLD 130 and the AP MLD 135 may communicate in accordance with an MLO framework associated with a fixed TSF offset between links and, accordingly, may maintain a fixed TSF offset between the first radio frequency link 205 and the second radio frequency link 210. As such, the AP MLD 135 may transmit, to the non-AP MLD 130 via the first radio frequency link 205, an indication of a time domain offset between the TSF of the first radio frequency link 205 and the TSF of the second radio frequency link 210 and the non-AP MLD 130 and the AP MLD 135 may derive the TSF (as well as any other timing information associated with the second radio frequency link 210) from the TSF or other timing information associated with the first radio frequency link 205.

Further, the non-AP MLD 130 may obtain or receive one or more traffic indications, one or more critical update indications 250, or a set of operational parameters associated with the second radio frequency link 210 via one or more beacons sent via the first radio frequency link 205, which may enable the non-AP MLD 130 to selectively monitor the second radio frequency link 210 for beacon frames 230 or enable the non-AP MLD 130 to refrain from monitoring the second radio frequency link 210 for beacon frames 230 (for performing basic service set (BSS) operations) altogether. For example, if the non-AP MLD 130 and the AP MLD 135 use the first radio frequency link 205 to indicate a set of operational parameters (such as a set of BSS operational parameters) associated with the second radio frequency link 210 as part of an MLO framework, the non-AP MLD 130 and the AP MLD 135 may eliminate the need for monitoring for beacon frames 230 sent via the second radio frequency link 210 for performing basic BSS operations. In such examples, an MLO framework may provide a mechanism to tunnel individually addressed management frames, such that individually addressed management frames meant for the second radio frequency link 210 may be sent via the first radio frequency link 205. As such, the non-AP MLD 130 and the AP MLD 135 may refrain from using a dedicated interval (such as an announcement transmission interval (ATI)) associated with exchanging individually addressed management frames via the second radio frequency link 210.

Additionally, or alternatively, if the non-AP MLD 130 and the AP MLD 135 use the first radio frequency link 205 to convey one or more critical update indications 250 associated with the second radio frequency link 210 as part of an MLO framework, the non-AP MLD 130 may selectively monitor the second radio frequency link 210 for one or more beacon frames 230 depending on whether a critical update indication 250 is received in the control information 225. Accordingly, the non-AP MLD 130 may monitor the second radio frequency link 210 for operational parameters (such as BSS operational parameters conveyed by a beacon frame 230) if the non-AP MLD 130 receives a critical update indication 250 and may refrain from monitoring the second radio frequency link 210 for operational parameters if the non-AP MLD 130 does not receive a critical update indication 250.

Additionally, or alternatively, the control information 225 may include coordination information or scheduling information associated with second radio frequency link 210 communications. For example, the non-AP MLD 130 and the AP MLD 135 may use the first radio frequency link 205 as an anchor link to facilitate operations on the second radio frequency link 210 and may likewise use the first radio frequency link 205 to coordinate transmissions among second radio frequency link 210 participants (such as among one or more STAs 115 or APs 105 associated with, or capable of using, the second radio frequency link 210). In some aspects, the non-AP MLD 130 and the AP MLD 135 may use the first radio frequency link 205 as a post-association anchor channel. For example, the identifying information 220 may include beacon information, advertisement information, and association information and the control information 225 may include post-association control, feedback, and management information. As such, the first radio frequency link 205 may serve as a stable control or feedback channel to manage and facilitate activities (such as data transmissions or exchanges) on the second radio frequency link 210 and enable the non-AP MLD 130 to perform basic operations by monitoring a single link (such as the first radio frequency link 205), which may provide a robust data pipeline in accordance with reducing overhead from the second radio frequency link 210.

In some implementations, the non-AP MLD 130 and the AP MLD 135 may selectively support transmission of beacon frames 230 via the second radio frequency link 210. For example, the non-AP MLD 130 may perform conditional beacon frame reception 260 and the AP MLD 135 may perform conditional beacon frame transmission 265, where transmission and reception of a beacon frame 230 via the second radio frequency link 210 is associated with a satisfaction of a condition. For example, while eliminating beacon frames 230 from the second radio frequency link 210 may reduce overhead, (sectorized) beacon frames 230 may assist the non-AP MLD 130 in deciding whether to perform beam training. For example, if a signal strength or quality of a beacon frame 230 fails to satisfy a threshold signal strength or quality (such as drops below a threshold signal strength or quality), the non-AP MLD 130 may perform beam training (such as select to perform beam training). To facilitate such signal strength or quality measurements, such as a received signal strength indicator (RSSI) measurement, the non-AP MLD 130 and the AP MLD 135 may support sectorized beacon frames 230 and a corresponding beacon transmit interval (BTI), or may support a short frame that the non-AP MLD 130 may use as a reference for evaluating whether beam training is to be performed.

In some implementations, the non-AP MLD 130 and the AP MLD 135 may support on-demand beacon frames 230. In such implementations, the non-AP MLD 130 and the AP MLD 135 may refrain from transmitting or receiving beacon frames during idle modes or idle conditions. The AP MLD 135 may indicate that second radio frequency link 210 beaconing is on-demand (such as via a field or bit in a sub-7 GHz beacon frame or a sub-7 GHz association response frame) and the non-AP MLD 130, or an associated STA 115, may transmit a request for a beacon frame 230 (such as a beacon frame 230 on the second radio frequency link 210). In some implementations, the non-AP MLD 130 or the associated STA 115 may transmit the request for the beacon frame 230 in accordance with an expiration of a period of inactivity or if the non-AP MLD 130 or the associated STA 115 otherwise determines to perform beam training with the AP MLD 135 (such as to perform an initiator sweep during a BTI). The indication that beacon frames 230 associated with the second radio frequency link 210 are on-demand and the request for a beacon frame 230 may be signaled via the first radio frequency link 205 or via the second radio frequency link 210 (such as during a dedicated SP (D-SP) on the second radio frequency link 210). Such on-demand beacon frames 230 for the second radio frequency link 210 may be especially suitable for soft AP devices or other devices in a power save mode or associated with power saving functionalities.

Additionally, or alternatively, the non-AP MLD 130 and the AP MLD 135 may turn off second radio frequency link 210 beacon frames 230 in accordance with a topology, stability, location, mobility state, or proximity associated with the non-AP MLD 130 and the AP MLD 135. For example, the non-AP MLD 130 and the AP MLD 135 may turn off second radio frequency link 210 beacon frames 230 if the non-AP MLD 130 is in a low mobility configuration (such as during screen-sharing in a conference room, where a laptop sharing to a larger screen is unlikely to move much) and may turn on second radio frequency link 210 beacon frames 230 if the non-AP MLD 130 is in a high mobility configuration (such as moving around or changing location at or above a threshold frequency). The non-AP MLD 130 may select or determine its topology, stability, location, mobility state, or proximity (to the AP MLD 135) in accordance with one or more of various mechanisms.

In some scenarios, the non-AP MLD 130 may select or determine topology (and related information associated with whether or not beacon frames 230 are to be sent via the second radio frequency link 210) in accordance with a frequency of beam training. For example, if the non-AP MLD 130 or an associated STA 115 performs relatively infrequent beam training, the non-AP MLD 130 and the AP MLD 135 may determine that beacon frames 230 on the second radio frequency link 210 are unnecessary. Alternatively, if the non-AP MLD 130 or an associated STA 115 performs relatively frequent beam training, the non-AP MLD 130 and the AP MLD 135 may select or determine to transmit and receive beacon frames 230 on the second radio frequency link 210. In some scenarios, the non-AP MLD 130 and the AP MLD 135 may select or determine topology in accordance with whether the non-AP MLD 130 (or an associated STA 115) is connected with a cable (such as an ethernet cable, a Wi-Fi dock, or a high definition multimedia interface (HDMI) cable). In some scenarios, the non-AP MLD 130 and the AP MLD 135 may use a machine learning (ML) algorithm to detect whether to turn second radio frequency link 210 beacon frames 230 on or off. The ML algorithm (or the algorithm that the non-AP MLD 130 or the AP MLD 135 uses to determine whether to transmit or receive beacon frames 230 on the second radio frequency link 210) may be associated with a detected location of the non-AP MLD 130, one or more connections of the non-AP MLD 130, a motion of the non-AP MLD 130, or one or more applications running at the non-AP MLD 130.

Additionally, or alternatively, the non-AP MLD 130 and the AP MLD 135 may use other channel estimation procedures to obtain beamforming information associated with the second radio frequency link 210 and may refrain from transmitting or receiving beacon frames 230 using the second radio frequency link 210 in accordance with performing one or more of those other channel estimation procedures. For example, the non-AP MLD 130 and the AP MLD 135 may perform one or more ranging measurements or one or more radio frequency measurements (such as radio frequency sensing measurements, which may be referred to as RF sensing, and which may inform a device on whether the device is moving or not) and may use channel estimates obtained via the ranging measurements or the radio frequency measurements in lieu of sectorized beacon frames 230 on the second radio frequency link 210. In such examples, the AP MLD 135 may indicate a presence or absence of a beacon frame 230 (or an equivalent frame) during association and may expect that STAs 115 associated with the non-AP MLD 130 support one or both of ranging measurement- or radio frequency measurement-based sector estimation.

In scenarios in which the non-AP MLD 130 and the AP MLD 135 transmit and receive beacon frames 230 via the second radio frequency link 210, the non-AP MLD 130 and the AP MLD 135 may support a relatively longer BI to reduce an amount of BTI overhead. For example, increasing a length of the BI may reduce the relative amount of resources occupied by a BTI. Such an increase to the length of the BI may be especially suitable for softAP devices (or other devices in a power save mode). In some implementations, increasing the length of the BI may be conditional. For example, the non-AP MLD 130 and the AP MLD 135 may increase a length of the BI in scenarios in which the non-AP MLD 130, or an associated STA 115, is in a stationary configuration (such as connected to a Wi-Fi dock or performing screensharing). Further, if a BTI is not present during a BI, the non-AP MLD 130 and the AP MLD 135 may use the available resources for an opportunistic service or for contention-based access. In some implementations, the AP MLD 135 may indicate information associated with an absence of a BTI from a BI and indicate that the available resources are available for an opportunistic service or for contention-based access during multi-link setup, during discovery, via an advertisement on the first radio frequency link 205, or any combination thereof. Additional details relating to BIs and BTIs are illustrated by and described with reference to FIG. 6.

In accordance with the identifying information 220, the control information 225, and optionally the beacon frame 230, the non-AP MLD 130 may communicate (such as transmit or receive) one or more data messages 235 with the AP MLD 135 during an SP of the second radio frequency link 210. In other words, SPs associated with the second radio frequency link 210 may be setup via frame exchanges sent using the first radio frequency link 205. For example, the non-AP MLD 130 and the AP MLD 135 may perform target wake time (TWT) setup on the first radio frequency link 205 for the second radio frequency link 210 (via tunneling). In some aspects, a STA 115 associated with the non-AP MLD 130 may beamform and be ready for communication at the beginning of an SP and may enter a power save mode after expiration of a timer (such as after a time out) if the STA 115 is not triggered or scheduled for communication. For example, an AP MLD 135 may send a trigger message to a non-AP MLD 130 to request the non-AP MLD 130 to provide any information on data to be transmitted from the non-AP MLD 130 or whether the non-AP MLD 130 is to use the second radio frequency link 210 for data and, if the trigger message is not received prior to an expiration of a time out timer, the non-AP MLD 130 may enter a power save mode. In some aspects, buffer status may be at the MLD level. As such, a buffer status report poll (BSRP) sent via the first radio frequency link 205 may provide a buffer status associated with uplink data units or buffered units (BUs), which may enable the non-AP MLD 130 and the AP MLD 135 to refrain from performing a special or dedicated polling using the second radio frequency link 210.

Further, an SP may be trigger enabled if the SP is shared (such as if there is an overlapping individual TWT (i-TWT) or broadcast TWT (b-TWT)/restricted TWT (r-TWT)). For example, an AP 105 of the AP MLD 135 may send a trigger at a start of an SP to indicate which STA 115 of the non-AP MLD 130 the AP 105 intends to service during the SP and the non-AP MLD 130 and the AP MLD 135 may communicate data using the triggered STA 115 (such as the triggered link) accordingly. If the SP is dedicated for a single non-AP STA 115, the SP may not be trigger enabled. An i-TWT may refer to TWT SP setup between an AP 105 and one non-AP STA 115. A b-TWT may refer to a TWT SP advertised by an AP 105 that is available to a set of STAs 115 (such as all STAs 115 within a coverage area of the AP 105). A STA 115 (such as an interested STA 115) may subscribe to one or more b-TWTs. A STA 115 may request an AP 105 to setup a b-TWT or an AP 105 may advertise (without request or solicitation) one or more b-TWTs. An r-TWT may refer to a TWT SP that is "protected" in terms of channel access. For example, a TWT SP associated with an r-TWT may be associated with one or more channel access rules at the start of the TWT SP such that STAs 115 that subscribe to the TWT SP have priority to access the medium.

Further, being trigger enabled may include supporting a triggering of frames or any form of poll-response exchange (such as any form of poll-response exchange prior to a data frame exchange). In some aspects, SPs may not be associated with a TWT. For example, a specification associated with GHz operation may define a mechanism associated with establishing SPs on the second radio frequency link 210 and the non-AP MLD 130 and the AP MLD 135 may support such a mechanism accordingly. In some aspects, one or both of the non-AP MLD 130 and the AP MLD 135 may support peer-to-peer (P2P) communication. In such aspects, a STA 115 associated with the non-AP MLD 130 may provide a buffer status for the P2P communication, which may include a bandwidth-time product or a link identifier, or both, of the second radio frequency link 210. Further, an AP 105 associated with the AP MLD 135 may assist with off-channel TWT configurations to support P2P communication.

In some aspects, a traffic indication map (TIM) information element associated with the non-AP MLD 130 may follow an MLO framework. For example, a bit in the TIM may be set to 1 if a set of STAs 115 (such as all STAs 115, including the one operating using the second radio frequency link 210) of the non-AP MLD 130 that operate on a link to which a TID for which the AP MLD 135 has BUs are in a doze state. As such, the bit in the TIM may be set to 1 independent of SP setup such that the TIM bit is set to 1 if a TID is mapped to the second radio frequency link 210 and other STAs 115 of the non-AP MLD 130 are in a doze state. Accordingly, the second radio frequency link 210 may appear to be in a doze state. Further, the non-AP MLD 130 and the AP MLD 135 may assume that a TID is mapping to both the first radio frequency link 205 and the second radio frequency link 210 and may support some directionality constraint associated with the data messages 235 transmitted via the second radio frequency link 210.

For example, the non-AP MLD 130 may select, choose, or otherwise determine to retrieve downlink BUs exclusively via the first radio frequency link 205, exclusively via the second radio frequency link 210, or via both the first radio frequency link 205 and the second radio frequency link 210. Similarly, the non-AP MLD 130 may select, choose, or otherwise determine to transmit uplink BUs exclusively via the first radio frequency link 205, exclusively via the second radio frequency link 210, or via both the first radio frequency link 205 and the second radio frequency link 210. For example, the non-AP MLD 130 may choose to save power when using the second radio frequency link 210 and may decide to perform uplink or downlink via the first radio frequency link 205 and not to perform uplink or downlink via the second radio frequency link 210. The non-AP MLD 130 may signal such a directionality constraint associated with the first radio frequency link 205 and the second radio frequency link 210 to the AP MLD 135. For example, the non-AP MLD 130 may signal or indicate an intention to use the second radio frequency link 210 for either or both of uplink and downlink in accordance with responding to a poll received from an AP 105 associated with the AP MLD 135 during a D-SP.

In accordance with communicating the data messages 235 via the second radio frequency link 210 during an SP associated with the second radio frequency link 210, the non-AP MLD 130 or the AP MLD 135 may transmit feedback information 240 to the other of the non-AP MLD 130 or the AP MLD 135 to inform a transmitting device of whether the data messages 235 were successfully received at a receiving device. In some implementations, the non-AP MLD 130 and the AP MLD 135 may transmit or receive the feedback information 240 via the first radio frequency link 205 in accordance with using the first radio frequency link 205 as a control and management link to support data communications via the second radio frequency link 210. The feedback information 240 may include one or more acknowledgments (ACKs) or one or more negative ACKs (NACKs) associated with the data messages 235. The device that receives the feedback information 240 may perform one or more retransmissions of at least a subset of the data messages 235 if a NACK is received via the feedback information 240. The retransmissions may be performed via the first radio frequency link 205 or via the second radio frequency link 210.

Figure 3:
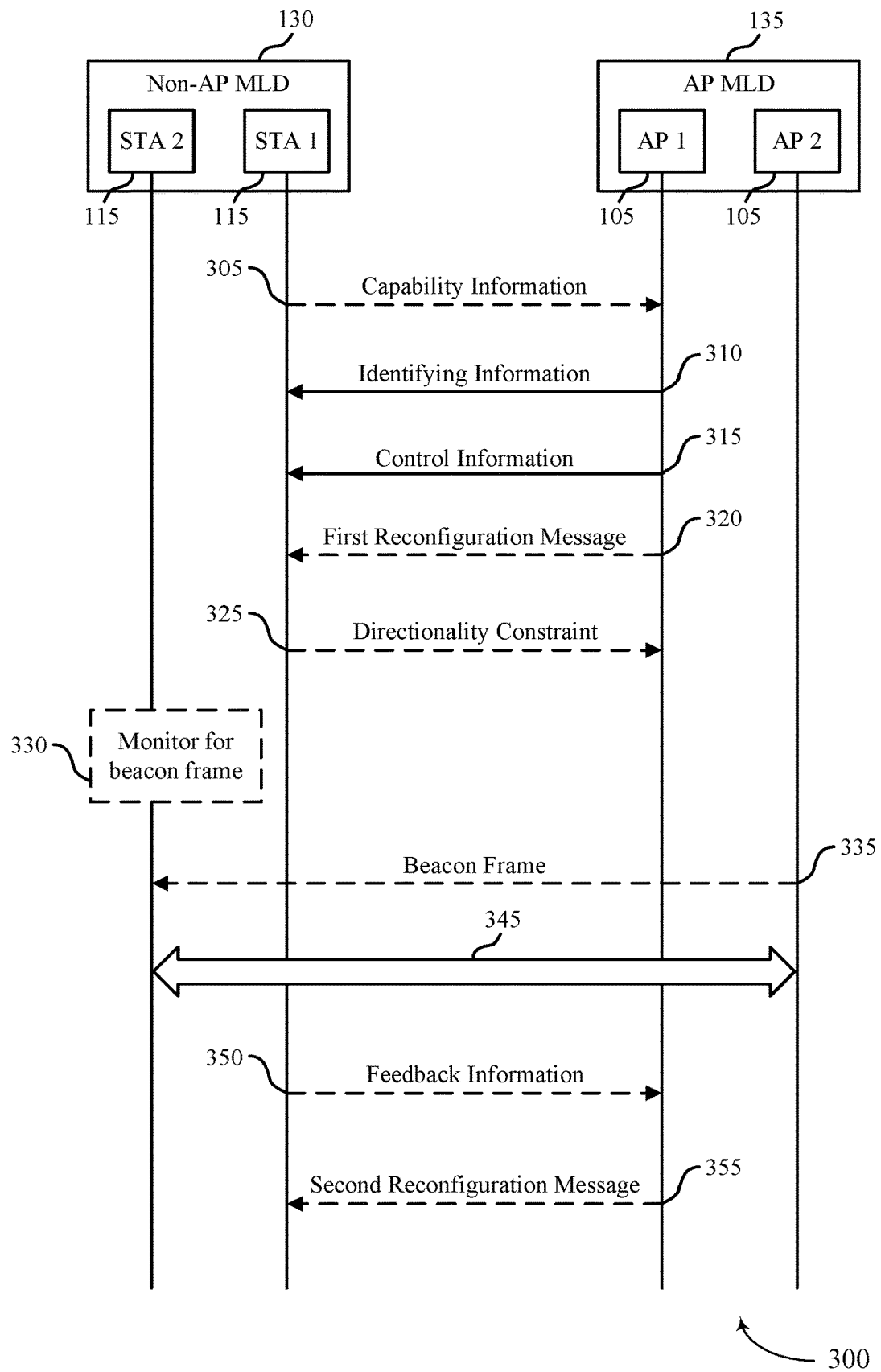
FIG. 3 shows an example process flow that supports high frequency multi-link support systems operation.

FIG. 3 shows an example process flow 300 that supports high frequency multi-link support systems operation. The process flow 300 may implement or be implemented to realize aspects of the wireless communications system 100 or the signaling diagram 200. For example, the process flow 300 illustrates communication between a non-AP MLD 130 and an AP MLD 135. The non-AP MLD 130, which may be an example of a non-AP MLD 130 as illustrated by and described with reference to FIGS. 1 and 2, may include or be associated with at least a first STA 115 (illustrated as a STA 1) and a second STA 115 (illustrated as a STA 2). The AP MLD 135, which may be an example of an AP MLD 135 as illustrated by and described with reference to FIGS. 1 and 2, may include or be associated with at least a first AP 105 (illustrated as an AP 1) and a second AP 105 (illustrated as an AP 2). In some implementations, the non-AP MLD 130 may use the first STA 115 for communication via a first radio frequency link (such as a sub-7 GHz link, such as a 2.4 GHz, 5 GHz, or 6 GHz link) and may use the second STA 115 for communication via a second radio frequency link (such as a 3.5 GHz, 45 GHz, or 60 GHz link). Similarly, the AP MLD 135 may use the first AP 105 for communication via the first radio frequency link and may use the second AP 105 for communication via the second radio frequency link.

In the following description of the process flow 300, the operations may be performed (such as reported or provided) in a different order than the order shown, or the operations performed by the example devices may be performed in different orders or at different times. Some operations also may be left out of the process flow 300, or other operations may be added to the process flow 300. Further, although some operations or signaling may be shown to occur at different times for discussion purposes, these operations may actually occur at the same time.

At 305, the non-AP MLD 130 may transmit, to the AP MLD 135 via the first radio frequency link, an indication of a capability of the non-AP MLD 130 associated with the second radio frequency link. For example, the non-AP MLD 130 may indicate whether the non-AP MLD 130 is capable of communicating via the second radio frequency link. In examples in which the non-AP MLD 130 is not capable of communicating via the second radio frequency link or otherwise chooses to operate (such as exclusively operate) using the first radio frequency link, the non-AP MLD 130 may refrain from responding to a poll from the AP MLD 135 via the second radio frequency link.

At 310, the AP MLD 135 may transmit, to the non-AP MLD 130 via the first radio frequency link, identifying information associated with the second radio frequency link as part of an MLO between the non-AP MLD 130 and the AP MLD 135. The identifying information may include discovery information of the second radio frequency link (which may be sent via an RNR element in a beacon frame or in a probe response frame), advertisement of complete or partial information related to the second radio frequency link (which may be sent via a multi-link probe response), or association information including the second radio frequency link (which may be sent via an association frame exchange). In some aspects, the identifying information may indicate a restriction associated with a use of the second radio frequency link. The identifying information transmitted by the AP MLD 135 and received by the non-AP MLD 130 at 310 may be an example of the identifying information 220 as illustrated by and described with reference to FIG. 2.

At 315, the AP MLD 135 may transmit, to the non-AP MLD 130 via the first radio frequency link, control information associated with communications using the second radio frequency link. In some implementations, such as implementations in which the second radio frequency link is a 45 GHz or 60 GHz link, the communications using the second radio frequency link may be associated with a configuration for directional transmissions between the non-AP MLD 130 and the AP MLD 135. In other words, the non-AP MLD 130 and the AP MLD 135 may use focused transmit and receive beams to transmit or receive via a 45 GHz or 60 GHz link.

The control information may include timing information associated with a time domain offset between communications using the first radio frequency link and communications using the second radio frequency link, a duration of a BI, a traffic indication, information associated with an SP of the second radio frequency link, an indication of a critical update to one or more operational parameters associated with the second radio frequency link, or a set of operational parameters associated with the second radio frequency link. The AP MLD 135 may transmit, and the non-AP MLD 130 may receive, the control information via one or more management frames and the control information may include post-association control or management information. The management frames, which may be individually addressed management frames, may include a beacon frame, a probe response frame, a multi-link probe response, an association response frame, a reassociation response frame, or any combination thereof. The control information transmitted by the AP MLD 135 and received by the non-AP MLD 130 at 315 may be an example of control information 225 as illustrated by and described with reference to FIG. 2.

At 320, and in implementations in which the identifying information indicates a restriction associated with a use of the second radio frequency link, the AP-MLD 210 may transmit, via the first radio frequency link, a first multi-link reconfiguration message associated with an addition of the second radio frequency link to a multi-link setup between the non-AP MLD 130 and the AP MLD 135 in accordance with a satisfaction of a condition (such as a payment-, location-, or proximity-based condition). As such, the non-AP MLD 130 and the AP MLD 135 may use the second radio frequency link in accordance with the satisfaction of the condition.

At 325, the non-AP MLD 130 may transmit, to the AP MLD 135, an indication of a directionality constraint associated with one or both of the first radio frequency link and the second radio frequency link. In some implementations, the directionality constraint may indicate that the non-AP MLD 130 supports uplink communication or downlink communication, or both, using the first radio frequency link and supports uplink communication or downlink communication, or both, using the second radio frequency link.

At 330, the non-AP MLD 130 may optionally, selectively, or conditionally monitor the second radio frequency link for a beacon frame. For example, the non-AP MLD 130 and the AP MLD 135 may refrain from transmitting beacon frames via the second radio frequency link or may support a conditional transmission of beacon frames via the second radio frequency link. Accordingly, the non-AP MLD 130 may monitor the second radio frequency link in implementations in which conditional transmission of beacon frames via the second radio frequency link is supported and in which a corresponding condition is satisfied. In some implementations, the non-AP MLD 130 may monitor the second radio frequency link in accordance with receiving an indication of a critical update to one or more operational parameters associated with the second radio frequency link.

At 335, the AP MLD 135 may optionally, selectively, or conditionally transmit a beacon frame via the second radio frequency link. For example, the non-AP MLD 130 and the AP MLD 135 may refrain from transmitting beacon frames via the second radio frequency link or may support a conditional transmission of beacon frames via the second radio frequency link. In implementations in which conditional transmission of beacon frames via the second radio frequency link is supported and in which a corresponding condition is satisfied, the AP MLD 135 may transmit a beacon frame via the second radio frequency link.

At 345, the non-AP MLD 130 and the AP MLD 135 may communicate one or more data messages via the second radio frequency link in accordance with the identifying information and the control information communicated via the first radio frequency link. For example, the non-AP MLD 130 and the AP MLD 135 may transmit or receive one or more data messages in accordance with a TWT, beamforming information, scheduling information, or traffic indications that the non-AP MLD 130 and the AP MLD 135 conveyed via the first radio frequency link.

At 350, the non-AP MLD 130 may transmit, to the AP MLD 135 via the first radio frequency link, feedback information associated with the one or more data messages communicated via the second radio frequency link. For example, the non-AP MLD 130 may receive one or more data messages via the second radio frequency link at 345 and may transmit feedback information associated with the one or more received data messages via the first radio frequency link at 350. Additionally, or alternatively, the non-AP MLD 130 may transmit an indication of a status of a set of operating conditions associated with the second radio frequency link, an indication of changes to the set of operating conditions associated with the second radio frequency link, or a response to a query received from the AP MLD 135 via the second radio frequency link. For example, the non-AP MLD 130 may transmit a query (such as a request for information or operational parameters) to the AP MLD 135 via the first radio frequency link or the second radio frequency link and may monitor for a response to the query on either the first radio frequency link or the second radio frequency link (where monitoring the second radio frequency link may be associated with monitoring for a beacon frame sent via the second radio frequency link in response to the query).

At 355, and in implementations in which the identifying information indicates a restriction associated with a use of the second radio frequency link, the AP MLD 135 may transmit, to the non-AP MLD 130, a second multi-link reconfiguration message associated with a removal of the second radio frequency link from the multi-link setup between the non-AP MLD 130 and the AP MLD 135 in accordance with a condition associated with the restriction no longer being satisfied.

Figure 4:
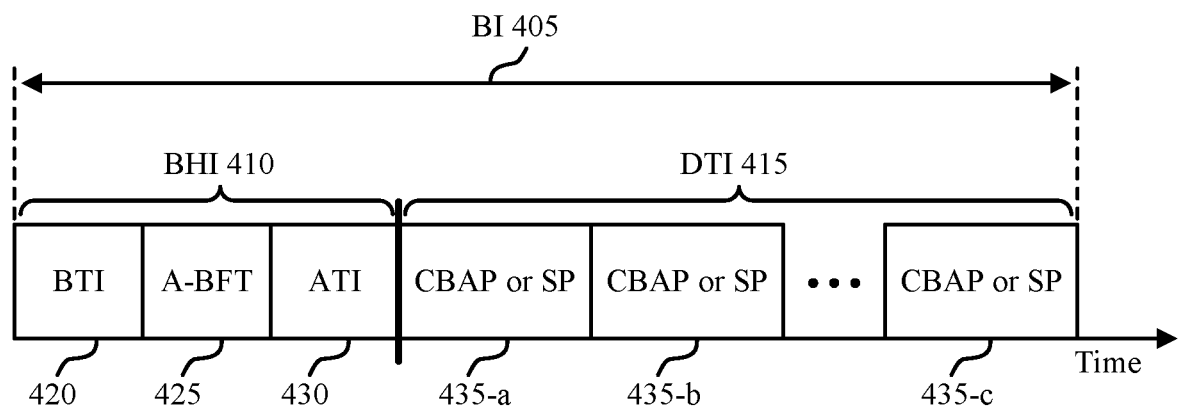
FIG. 4 shows example signaling during a beacon interval (BI) that supports high frequency multi-link support systems operation.

FIG. 4 shows example BI signaling 400 that supports high frequency multi-link support systems operation. The BI signaling 400 may implement or be implemented to realize aspects of the wireless communications system 100, the signaling diagram 200, or the process flow 300. For example, the BI signaling 400 illustrates an example format according to which an AP MLD 135 may transmit a beacon frame to a non-AP MLD 130, where such an AP MLD 135 may be an example of an AP MLD 135 as illustrated by and described with reference to FIGS. 1-3 and such a non-AP MLD 130 may be an example of a non-AP MLD 130 as illustrated by and described with reference to FIGS. 1-3. In some implementations, the non-AP MLD 130 and the AP MLD 135 may transmit or receive beacon frames via a first radio frequency link (such as a sub-7 GHz link) and may support a conditional transmission of a beacon frame via a second radio frequency link (such as a 45 GHz or 60 GHz link). In some aspects, operation on a 60 GHz link may include repeating BIs 405 and the BI signaling 400 may illustrate the components of such repeating BIs 405.

The BI 405 may include a beacon header interval (BHI) 410 and a data transmission interval (DTI) 415. The BHI 410 may include three sub-intervals, including a BTI 420 during which an AP 105, an AP MLD 135, or a personal basic service set control point (PCP) may transmit multiple directional beacon frames, an association beamforming training (A-BFT) 425 during which one or more STAs 115 or non-AP MLDs 130 may perform beam training for communication with an AP 105, AP MLD 135, or PCP, and an ATI 430 during which an AP 105, AP MLD 135, or PCP may exchange management frames with associated and beam trained STAs 115 or non-AP MLDs 130.

The DTI 415 may include one or more contention-based access periods (CBAPs) or scheduled SPs, or a combination of the two, for exchanging data frames. For example, the DTI 415 may include a CBAP or SP frame 435-*a*, a CBAP or SP frame 435-*b*, and a CBAP or SP frame 435-*c*. SPs may be dynamic or pseudo-static. In some aspects, the DTI 415 may be a useful portion of time in the BI 405 during which actual data transmission between devices may occur.

Figure 5:
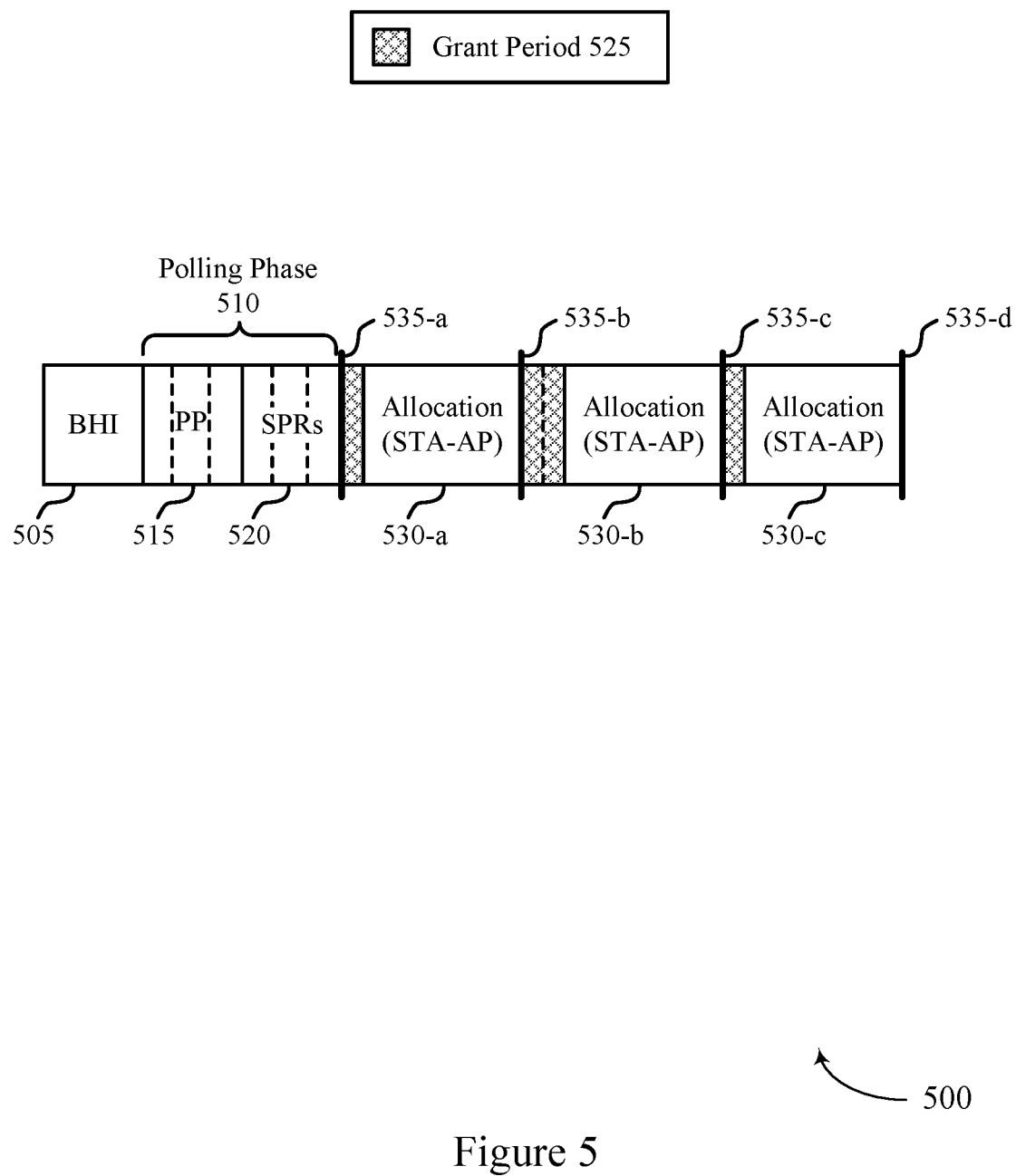
FIG. 5 shows example signaling corresponding to a service period (SP) assignment that supports high frequency multi-link support systems operation.

FIG. 5 shows example signaling corresponding to an SP assignment 500 that supports high frequency multi-link support systems operation. The SP assignment 500 may implement or be implemented to realize aspects of the wireless communications system 100, the signaling diagram 200, the process flow 300, or the BI signaling 400. For example, a STA 115 and an AP 105, or a non-AP MLD 130 and an AP MLD 135 (which may be an example of a STA 115 and an AP 105, or a non-AP MLD 130 and an AP MLD 135 as illustrated by or described with reference to FIGS. 1-4, respectively), may communicate in accordance with the SP assignment 500 during a DTI (such as during a DTI 415 as illustrated by and described with reference to FIG. 4) to grant or allocate resources for SPs during which two or more devices may exchange data frames.

The SP assignment 500 may include a BHI 505 (which may be an example of a BHI 410 as illustrated by and described with reference to FIG. 4), a polling phase 510 including a polling period 515 and a block of service period requests (SPRs) 520, a set of grant periods 525, and a set of allocations 530 (which may generally refer to any one or more of an allocation 530-*a*, an allocation 530-*b*, or an allocation 530-*c*. Communication during a DTI (such as the DTI 415) may be contention-based (and correspondingly associated with one or more CBAPs) or scheduled (and correspondingly associated with one or more SPs). As illustrated by the SP assignment 500, the polling phase 510 may be configured for 3 STAs 115 or non-AP MLDs 130 and may include a set of channel protection points 535 (which may generally refer to any one or more of a channel protection point 535-*a*, a channel protection point 535-*b*, a channel protection point 535-*c*, or a channel protection point 535-*d*. In some aspects, the channel protection points 535 may be indicated by one or more frame duration fields.

In some aspects, SP-based channel access may be associated with a greater efficiency as compared to CBAP (as a duration of an SP may be adapted to meet specific traffic), feature deterministic times communication (and beam directionality), and alleviate deafness. Setting up SPs involves polling by the AP 105, AP MLD 135, or PCP (such as to gather or obtain how many resources may be used by the data messages to be communicated) and an SP announcement. Such polling and announcement may be performed during an early portion of the DTI, which may reduce an amount of available time during the DTI for actually exchanging data. As such, communicating devices may negotiate between a relative amount of CBAPs and scheduled SPs, or opt for one or the other, in accordance with an amount of data to be communicated, channel conditions, or deployment scenario-specific decisions.

Figure 6:
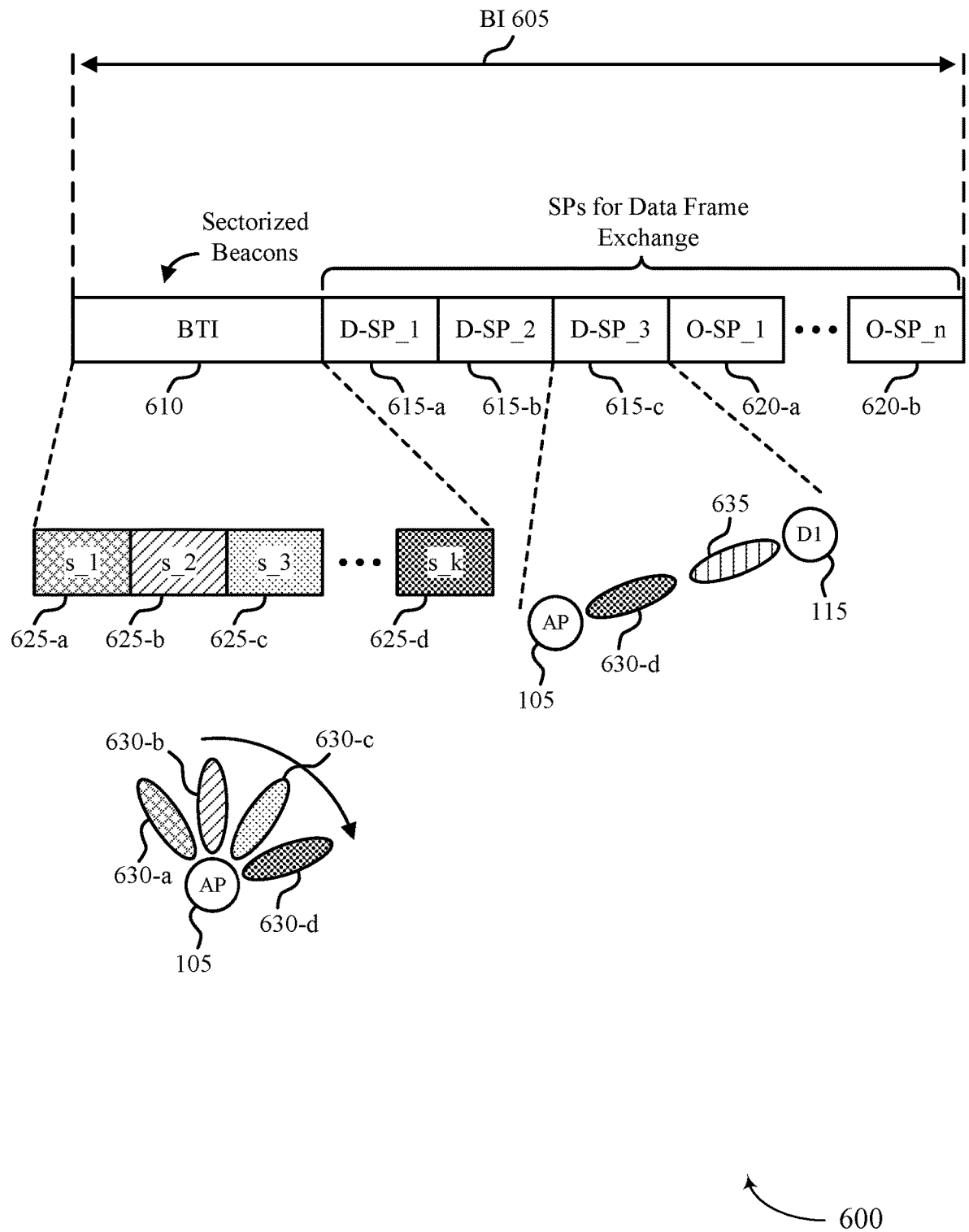
FIG. 6 shows an example beam training procedure that supports high frequency multi-link support systems operation.

FIG. 6 shows an example beam training procedure 600 that supports high frequency multi-link support systems operation. The beam training procedure 600 may implement or be implemented to realize aspects of the wireless communications system 100, the signaling diagram 200, the process flow 300, the BI signaling 400, or the SP assignment 500. For example, a STA 115 and an AP 105, or a non-AP MLD 130 and an AP MLD 135 (which may be an example of a STA 115 and an AP 105, or a non-AP MLD 130 and an AP MLD 135 as illustrated by or described with reference to FIGS. 1-5, respectively), may perform the beam training procedure 600 to measure a signal strength associated with one or more beam pairs and to select a beam pair associated with a suitable or greatest signal strength. In some implementations, the beam training procedure 600 may be a beacon frame-based beam training procedure according to which communicating devices may perform beam training via one or more sectorized beacons. For example, a BI 605 (which may be an example of a BI 405 as illustrated by and described with reference to FIG. 4) may include a BTI 610 (which may be an example of a BTI 420 as illustrated by and described with reference to FIG. 4) during which an AP 105 may transmit sectorized beacons in different beamformed directions during different beam training resources 625 (which may generally refer to any one or more of a beam training resource 625-*a*, a beam training resource 625-*b*, a beam training resource 625-*c*, and a beam training resource 625-*d*).

The beam training resource 625-*a* may be associated with a directional beam 630-*a* (which may be denoted as s 1) and the AP 105 may accordingly transmit a sectorized beacon frame during the beam training resource 625-*a* using the directional beam 630-*a*. Similarly, the beam training resource 625-*b* may be associated with a directional beam 630-*b* (which may be denoted as s 2), the beam training resource 625-*c* may be associated with a directional beam 630-*c* (which may be denoted as s 3), and the beam training resource 625-*d* may be associated with a directional beam 630-*d* (which may be denoted as s k). As such, the AP 105 may sweep across a set of directional beams 630 (which may generally refer to any one or more of the directional beam 630-*a*, the directional beam 630-*b*, the directional beam 630-*c*, or the directional beam 630-*d*) during the BTI 610. A STA 115 may measure the various directional beams 630 used by the AP 105 using a and identify a suitable beam pair that the AP 105 and the STA 115 may use for exchanging data. Accordingly, the AP 105 and the STA 115 may communicate data during an SP for data frame exchange using the suitable beam pair.

For example, the STA 115 and the AP 105 may communicate during one or more of a D-SP 615-*a*, a D-SP 615-*b*, and a D-SP 615-*c* using the suitable beam pair. Additionally, or alternatively, the STA 115 and the AP 105 may perform beam training during any one or more of the D-SP 615-*a*, the D-SP 615-*b*, and the D-SP 615-*c*. As illustrated by the beam training procedure 600, the AP 105 may use the directional beam 630-*d* and the STA 115 may use a directional beam 635 during the D-SP 615-*c*. The STA 115 and the AP 105 also may communicate during one or more open SPs (O-SPs) 620 (which may generally refer to any one or more of an O-SP 620-*a* and an O-SP 620-*b*).

In accordance with the implementations described herein, a non-AP MLD 130 (or a STA 115 associated with a non-AP MLD 130) and an AP MLD 135 (or an AP 105 associated with an AP MLD 135) may perform the beam training procedure 600 using a 60 GHz link in scenarios in which the non-AP MLD 130 and the AP MLD 135 support 60 GHz link beacon frames. In some implementations, the non-AP MLD 130 and the AP MLD 135 may conditionally support beacon frame transmissions using the 60 GHz link. For example, the AP MLD 135 may transmit one or more sectorized beacon frames to the non-AP MLD 130 using the 60 GHz link in accordance with a satisfaction of a condition associated with 60 GHz link beacon frame transmissions.

Figure 7:
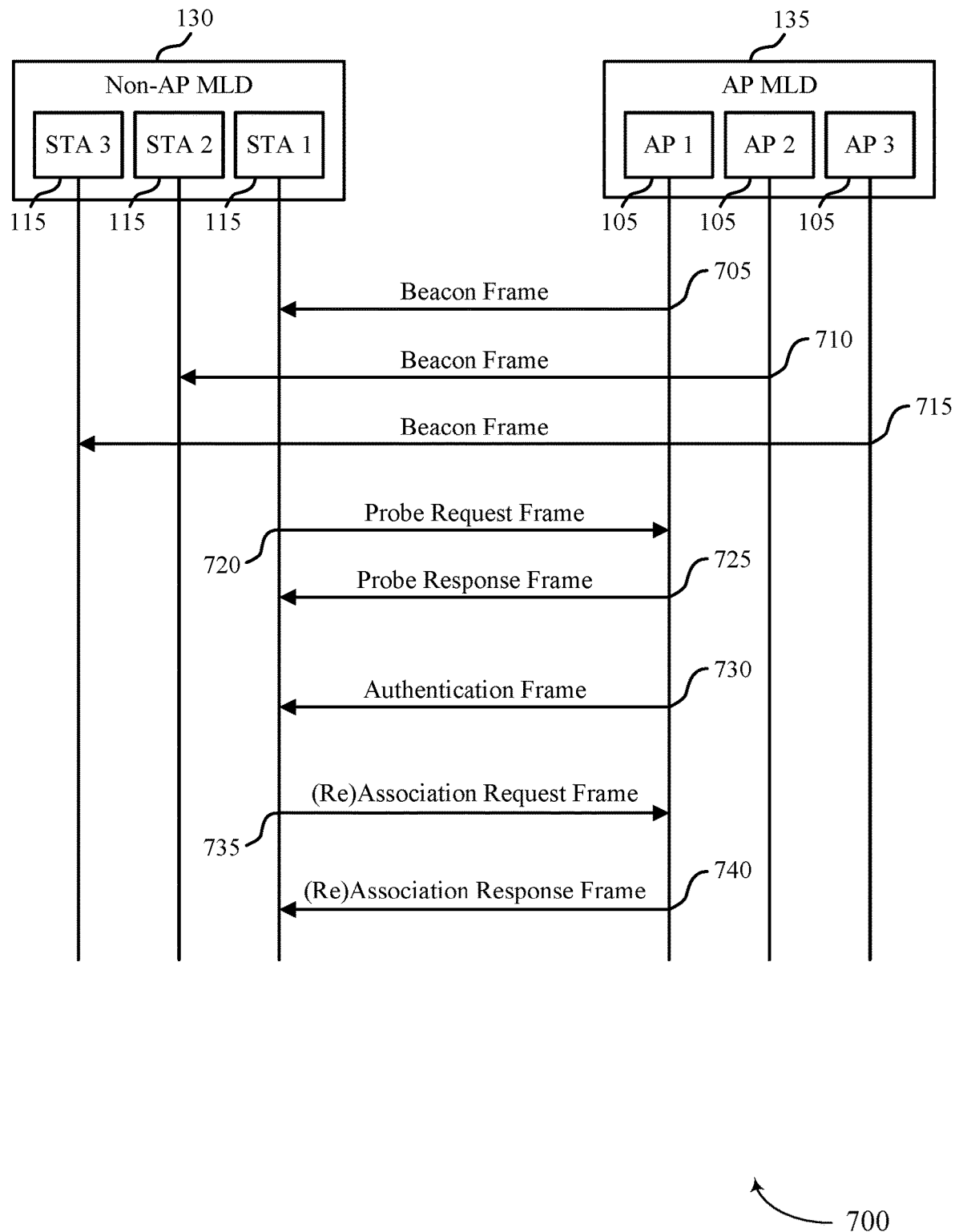
FIG. 7 shows an example process flow that supports high frequency multi-link support systems operation.

FIG. 7 shows an example process flow 700 that supports high frequency multi-link support systems operation. The process flow 700 may implement or be implemented to realize aspects of the wireless communications system 100, the signaling diagram 200, the process flow 300, the BI signaling 400, the SP assignment 500, or the beam training procedure 600. For example, the process flow 700 illustrates communication between a non-AP MLD 130 and an AP MLD 135. The non-AP MLD 130, which may be an example of a non-AP MLD 130 as illustrated by or described with reference to FIGS. 1-6, may include or be associated with at least a first STA 115 (illustrated as a STA 1), a second STA 115 (illustrated as a STA 2), and a third STA 115 (illustrated as a STA 3). The AP MLD 135, which may be an example of an AP MLD 135 as illustrated by or described with reference to FIGS. 1-6, may include or be associated with at least a first AP 105 (illustrated as an AP 1), a second AP 105 (illustrated as an AP 2), and a third AP 105 (illustrated as an AP 3).

In some implementations, the non-AP MLD 130 and the AP MLD 135 may support MLO and multi-link setup according to which associated STAs 115 and Aps 105 may communicate via multiple different links. For example, the first STA 115 may communicate with the first AP 105 via a 2.4 GHz link, the second STA 115 may communicate with the second AP 105 via a 5 GHz link, and the third STA 115 may communicate with the third AP 105 via a 6 GHz link. Further, MLO may refer or apply to pre-association or post-association operation. As described herein, any one or more of such links may be referred to as a sub-7 GHz link and the non-AP MLD 130 and the AP MLD 135 may use a sub-7 GHz link (such as any one or more of the 2.4 GHz link, the 5 GHz link, or the 6 GHz link) to support and facilitate operations on a relatively higher radio frequency link, such as a 45 GHz or 60 GHz link. Further, the non-AP MLD 130 and the AP MLD 135 may use a sub-7 GHz link to support communication on any link associated with access constraints or difficulties, such as a 3.5 GHz link.

In the following description of the process flow 700, the operations may be performed (such as reported or provided) in a different order than the order shown, or the operations performed by the example devices may be performed in different orders or at different times. Some operations also may be left out of the process flow 700, or other operations may be added to the process flow 700. Further, although some operations or signaling may be shown to occur at different times for discussion purposes, these operations may actually occur at the same time.

At 705, the AP MLD 135 may transmit, to the non-AP MLD 130 via the 2.4 GHz link, a first beacon frame. In some aspects, the first beacon frame may include information associated with the 2.4 GHz link. In some implementations, the first beacon frame may include information (such as an indication of a critical update to one or more operational parameters or an indication of a set of operational parameters themselves) associated with a different radio frequency link, such as a 3.5 GHz, GHz, or 60 GHz link.

At 710, the AP MLD 135 may transmit, to the non-AP MLD 130 via the 5 GHz link, a second beacon frame. In some aspects, the second beacon frame may include information associated with the 5 GHz link. In some implementations, the second beacon frame may include information (such as an indication of a critical update to one or more operational parameters or an indication of a set of operational parameters themselves) associated with a different radio frequency link, such as a 3.5 GHz, 45 GHz, or 60 GHz link.

At 715, the AP MLD 135 may transmit, to the non-AP MLD 130 via the 6 GHz link, a third beacon frame. In some aspects, the third beacon frame may include information associated with the 6 GHz link. In some implementations, the third beacon frame may include information (such as an indication of a critical update to one or more operational parameters or an indication of a set of operational parameters themselves) associated with a different radio frequency link, such as a 3.5 GHz, GHz, or 60 GHz link. Additionally, in some implementations, multiple of the first beacon frame, the second beacon frame, or the third beacon frame may collectively or in combination indicate the information associated with the different radio frequency link.

At 720, the non-AP MLD 130 may transmit, to the AP MLD 135 via the 2.4 GHz link, a probe request frame. In some aspects, the probe request frame may be a multi-link probe request. A multi-link probe request may be transmitted by a STA 115 affiliated with the non-AP MLD 130 to request complete profile or select information of one or more APs 105 affiliated with the AP MLD 135.

At 725, the AP MLD 135 may transmit, to the non-AP MLD 130 via the 2.4 GHz link, a probe response frame. In some aspects, the probe response frame may be a multi-link probe response. A multi-link probe response may be transmitted by an AP 105 affiliated with the AP MLD 135 and (if the multi-link response carries multi-link information) may carry a basic multi-link element in response to a multi-link probe request to provide complete profile or requested information of one or more APs 105 affiliated with the AP MLD 135.

At 730, the AP MLD 135 may transmit an authentication frame to the non-AP MLD 130 via the 2.4 GHz link. In some aspects, the authentication frame may serve to authenticate or otherwise validate one or more links between the AP MLD 135 and the non-AP MLD 130.

At 735, the non-AP MLD 130 may transmit, to the AP MLD 135 via the 2.4 GHz link, an association or reassociation request frame. The association or reassociation request frame may include multi-link information, extremely high throughput (EHT) capability information, and TID-to-link mapping information. Such TID-to-link mapping information may indicate which one or more links the non-AP MLD 130 and the AP MLD 135 may use to transmit or receive scheduled traffic.

At 740, the AP MLD 135 may transmit, to the non-AP MLD 130 via the 2.4 GHz link, an association or reassociation response frame. The association or reassociation response frame may include TWT information, multi-link information, EHT capability information, EHT operation information, and TID-to-link mapping information.

Figure 8:
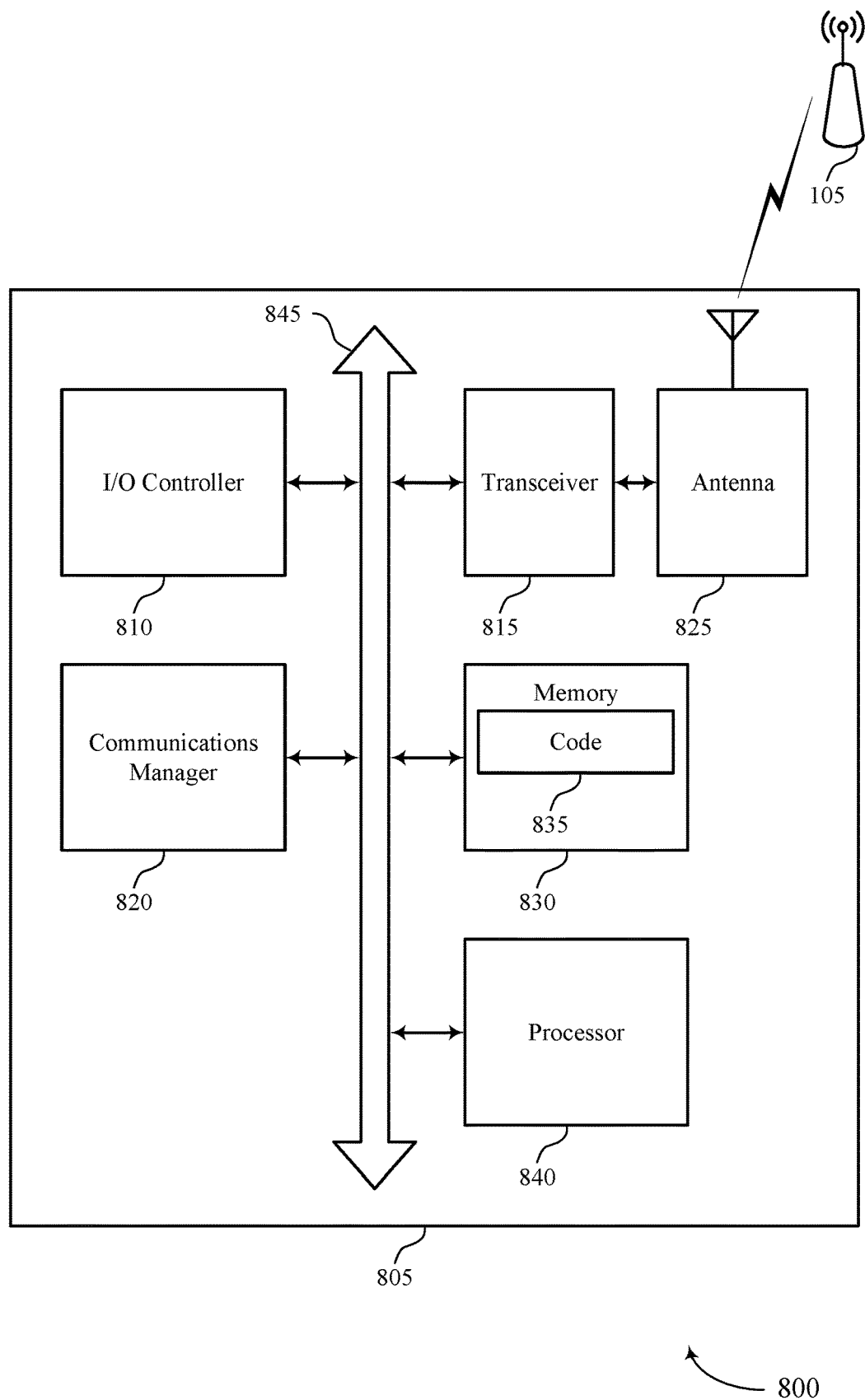
FIGS. 8 and 9 show block diagrams of example devices that support high frequency multi-link support systems operation.

FIG. 8 shows a block diagram 800 of an example device 805 that supports high frequency multi-link support systems operation. The device 805 may include components for bi-directional voice and data communications including components for transmitting and receiving communications, such as a communications manager 820, an I/O controller 810, a transceiver 815, an antenna 825, a memory 830, code 835, and a processor 840. These components may be in electronic communication or otherwise coupled (such as operatively, communicatively, functionally, electronically, electrically) via one or more buses (such as a bus 845).

The I/O controller 810 may manage input and output signals for the device 805. The I/O controller 810 also may manage peripherals not integrated into the device 805. In some implementations, the I/O controller 810 may represent a physical connection or port to an external peripheral. In some implementations, the I/O controller 810 may utilize an operating system such as iOS®, ANDROID®, MS-DOS®, MS-WINDOWS®, OS/2®, UNIX®, LINUX®, or another known operating system. In some other implementations, the I/O controller 810 may represent or interact with a modem, a keyboard, a mouse, a touchscreen, or a similar device. In some implementations, the I/O controller 810 may be implemented as part of a processor, such as the processor 840. In some implementations, a user may interact with the device 805 via the I/O controller 810 or via hardware components controlled by the I/O controller 810.

In some implementations, the device 805 may include a single antenna 825. However, in some other implementations, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 also may include a modem to modulate the packets, to provide the modulated packets to one or more antennas 825 for transmission, and to demodulate packets received from the one or more antennas 825. In some implementations, the transceiver 815 may include one or more interfaces, such as one or more interfaces coupled with the one or more antennas 825 that are configured to support various receiving or obtaining operations, or one or more interfaces coupled with the one or more antennas 825 that are configured to support various transmitting or outputting operations, or a combination thereof. In some implementations, the transceiver 815 may include or be configured for coupling with one or more processors or memory components that are operable to perform or support operations based on received or obtained information or signals, or to generate information or other signals for transmission or other outputting, or any combination thereof. In some implementations, the transceiver 815, or the transceiver 815 and the one or more antennas 825, or the transceiver 815 and the one or more antennas 825 and one or more processors or memory components (such as the processor 840, or the memory 830, or both), may be included in a chip or chip assembly that is installed in the device 805.

The memory 830 may include RAM and ROM. The memory 830 may store computer-readable, computer-executable code 835 including instructions that, when executed by the processor 840, cause the device 805 to perform various functions described herein. In some implementations, the memory 830 may contain, among other things, a BIOS which may control basic hardware or software operation such as the interaction with peripheral components or devices.

The processor 840 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some implementations, the processor 840 may be configured to operate a memory array using a memory controller. In some other implementations, a memory controller may be integrated into the processor 840. The processor 840 may be configured to execute computer-readable instructions stored in a memory (such as the memory 830) to cause the device 805 to perform various functions (such as functions or tasks supporting high frequency multi-link support systems operation). For example, the device 805 or a component of the device 805 may include a processor 840 and memory 830 coupled with or to the processor 840, the processor 840 and memory 830 configured to perform various functions described herein.

The processor 840 may be any one or more suitable processors capable of executing scripts or instructions of one or more software programs stored in the device 805 (such as within the memory 830). In some implementations, the processor 840 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 840, or the transceiver 815, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and an interface to output information, or to obtain information, or both. The interface may be implemented as or otherwise include one or more interfaces, such as a first interface configured to output information and a second interface configured to obtain information. In some implementations, the first interface may refer to an interface between the processing system of the chip or modem and a transmitter, such that the device 805 may transmit information output from the chip or modem. In some implementations, the second interface may refer to an interface between the processing system of the chip or modem and a receiver, such that the device 805 may obtain information or signal inputs, and the information may be passed to the processing system. A person having ordinary skill in the art will readily recognize that the first interface also may obtain information or signal inputs, and the second interface also may output information or signal outputs. As such, one or more interfaces may refer to a single interface configured to output information and obtain information or may refer to multiple interfaces including one interface configured to at least output information and another interface configured to at least obtain information.

The communications manager 820 may support wireless communications at a first MLD in accordance with examples as disclosed herein. For example, the communications manager 820 may be configured as or otherwise support a means for receiving, via a first radio frequency link, identifying information associated with a second radio frequency link in accordance with a multi-link operation between the first MLD and a second MLD. The communications manager 820 may be configured as or otherwise support a means for receiving, via the first radio frequency link, control information associated with communications using the second radio frequency link, where the communications using the second radio frequency link are associated with a configuration for directional transmissions between the first MLD and the second MLD. The communications manager 820 may be configured as or otherwise support a means for communicating, with the second MLD via the second radio frequency link, one or more data messages in accordance with the control information.

In some implementations, to support receiving the identifying information associated with the second radio frequency link, the communications manager 820 may be configured as or otherwise support a means for receiving, via an RNR element carried in a beacon frame or a probe response frame associated with the first radio frequency link, an indication of a restriction associated with use of the second radio frequency link. In some implementations, to support receiving the identifying information associated with the second radio frequency link, the communications manager 820 may be configured as or otherwise support a means for receiving, via a multi-link probe response, an indication of a condition associated with the use of the second radio frequency link, where a setup of the second radio frequency link is associated with a satisfaction of the condition.

In some implementations, the communications manager 820 may be configured as or otherwise support a means for receiving, via the first radio frequency link, a first multi-link reconfiguration message associated with an addition of the second radio frequency link to a multi-link setup between the first MLD and the second MLD in accordance with the satisfaction of the condition. In some implementations, the communications manager 820 may be configured as or otherwise support a means for receiving, via the first radio frequency link or the second radio frequency link, a second multi-link reconfiguration message associated with a removal of the second radio frequency link from the multi-link setup between the first MLD and the second MLD in accordance with the condition no longer being satisfied.

In some implementations, the addition of the second radio frequency link and the removal of the second radio frequency link are specific to the first MLD.

In some implementations, the communications manager 820 may be configured as or otherwise support a means for receiving, via the first radio frequency link, timing information corresponding to first communications using the first radio frequency link and a time domain offset between a first timing synchronization function of the first radio frequency link and a second timing synchronization function of the second radio frequency link, where a timing of the one or more data messages communicated via the second radio frequency link is associated with the timing information and the time domain offset.

In some implementations, the communications manager 820 may be configured as or otherwise support a means for transmitting, via the first radio frequency link, at least one of feedback information associated with at least one of the one or more data messages communicated via the second radio frequency link, a status of a set of operating conditions associated with the second radio frequency link, an indication of changes to the set of operating conditions associated with the second radio frequency link, or a response to a query received via the second radio frequency link.

In some implementations, to support receiving the identifying information associated with the second radio frequency link, the communications manager 820 may be configured as or otherwise support a means for receiving at least one of a multi-link probe response frame, an association frame, or an RNR element including the identifying information.

In some implementations, to support receiving the control information associated with the communications using the second radio frequency link, the communications manager 820 may be configured as or otherwise support a means for receiving, via the first radio frequency link, one or more management frames including information which includes at least one of a duration of a BI, timing information, a traffic indication, information associated with a service period of the second radio frequency link, an indication of a critical update to one or more operational parameters associated with the second radio frequency link, or a set of operational parameters associated with the second radio frequency link, or any combination thereof.

In some implementations, the communications manager 820 may be configured as or otherwise support a means for monitoring the second radio frequency link for a beacon frame including the set of operational parameters associated with the second radio frequency link in accordance with receiving the indication of the critical update to the one or more operational parameters associated with the second radio frequency link via the one or more beacon frames.

In some implementations, the one or more management frames include a beacon frame, a probe response frame, a multi-link probe response, an association response frame, or a reassociation response frame.

In some implementations, the communications manager 820 may be configured as or otherwise support a means for receiving, via the first radio frequency link, one or more individually addressed management frames associated with the second radio frequency link.

In some implementations, the communications manager 820 may be configured as or otherwise support a means for receiving, via the second radio frequency link, a beacon frame in accordance with a satisfaction of a condition, where the beacon frame is associated with a beam training at the first MLD.

In some implementations, the communications manager 820 may be configured as or otherwise support a means for receiving, via the first radio frequency link, information indicating that beacon frames on the second radio frequency link are on-demand. In some implementations, the communications manager 820 may be configured as or otherwise support a means for transmitting, via the first radio frequency link or the second radio frequency link, a request for the beacon frame on the second radio frequency link, where the satisfaction of the condition is associated with the request for the beacon frame.

In some implementations, the satisfaction of the condition is associated with a topology around the first MLD, a high-mobility configuration of the first MLD, a signal strength measurement at the first MLD being below a threshold signal strength measurement, a frequency of beam training on the second radio frequency link, or an indication of a presence of the beacon frame on the second radio frequency link via a management frame received on the first radio frequency link.

In some implementations, the communications manager 820 may be configured as or otherwise support a means for performing one or more ranging measurements or one or more radio frequency measurements, or both, using the first radio frequency link. In some implementations, the communications manager 820 may be configured as or otherwise support a means for transmitting, via the first radio frequency link, an indication of the one or more ranging measurements or the one or more radio frequency measurements, or both, where performing the one or more ranging measurements or the one or more radio frequency measurements, or both, is associated with an absence of a beacon frame from the second radio frequency link.

In some implementations, the communications manager 820 may be configured as or otherwise support a means for receiving an indication that a beacon frame is absent from a beacon interval of the second radio frequency link, where the one or more data messages are communicated during a beacon transmit interval associated with the beacon frame in accordance with the indication that the beacon frame is absent.

In some implementations, the communications manager 820 may be configured as or otherwise support a means for transmitting an indication of a directionality constraint associated with the first radio frequency link and the second radio frequency link, where the directionality constraint indicates an election by the first MLD to support uplink or downlink, or both, using the first radio frequency link and to support uplink or downlink, or both, using the second radio frequency link.

In some implementations, the first MLD functions as a soft AP MLD. In some implementations, the soft AP MLD uses a same set of radio frequency chains as the first MLD.

In some implementations, the communications manager 820 may be configured as or otherwise support a means for transmitting, via the first radio frequency link and using a first AP that is affiliated with the soft AP MLD, the identifying information and the control information associated with the second radio frequency link.

In some implementations, the first radio frequency link is a sub-7 GHz link and the second radio frequency link is a 60 GHz link or a 45 GHz link.

Figure 9:
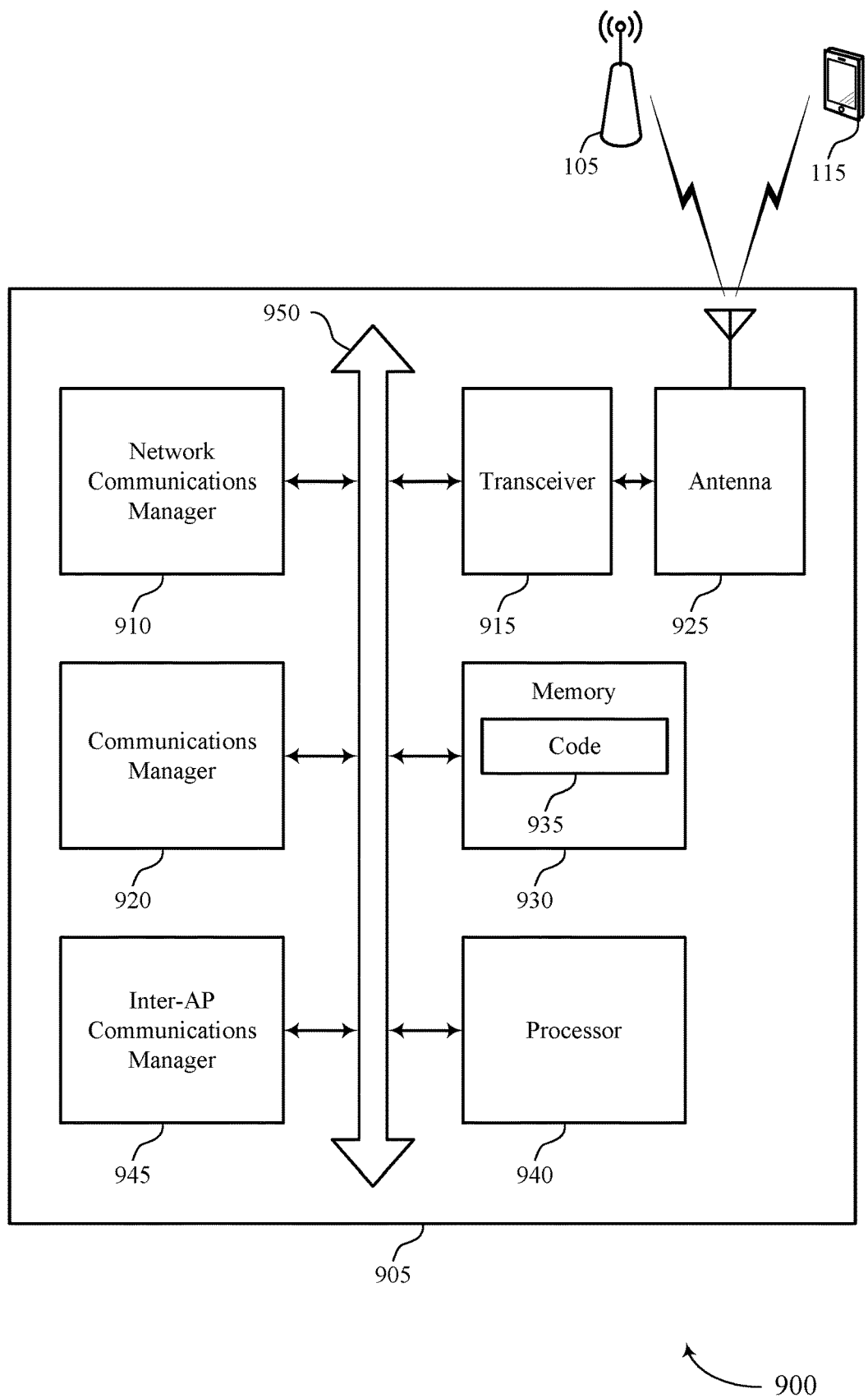

FIG. 9 shows a block diagram 900 of an example device 905 that supports high frequency multi-link support systems operation. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-AP communications manager 945. These components may be in electronic communication or otherwise coupled (such as operatively, communicatively, functionally, electronically, electrically) via one or more buses (such as a bus 950).

The network communications manager 910 may manage communications with a core network (such as via one or more wired backhaul links). For example, the network communications manager 910 may manage the transfer of data communications for client devices, such as one or more STAs 115.

In some implementations, the device 905 may include a single antenna 925. However, in some other implementations the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 also may include a modem to modulate the packets and provide the modulated packets to one or more antennas 925 for transmission, and to demodulate packets received from the one or more antennas 925.

The memory 930 may include RAM and ROM. The memory 930 may store computer-readable, computer-executable code 935 including instructions that, when executed by the processor 940, cause the device 905 to perform various functions described herein. In some implementations, the memory 930 may contain, among other things, a BIOS which may control basic hardware or software operation such as the interaction with peripheral components or devices.

The processor 940 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the processor 940 may be configured to operate a memory array using a memory controller. In some other implementations, a memory controller may be integrated into the processor 940. The processor 940 may be configured to execute computer-readable instructions stored in a memory (such as the memory 930) to cause the device 905 to perform various functions (such as functions or tasks supporting high frequency multi-link support systems operation). For example, the device 905 or a component of the device 905 may include a processor 940 and memory 930 coupled with the processor 940, the processor 940 and memory 930 configured to perform various functions described herein. The processor 940 may be an example of a cloud-computing platform (such as one or more physical nodes and supporting software such as operating systems, virtual machines, or container instances) that may host the functions (such as by executing code 935) to perform the functions of the device 905. The processor 940 may be any one or more suitable processors capable of executing scripts or instructions of one or more software programs stored in the device 905 (such as within the memory 930). In some implementations, the processor 940 may be a component of a processing system.

A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 940, or the transceiver 915, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and an interface to output information, or to obtain information, or both. The interface may be implemented as or otherwise include one or more interfaces, such as a first interface configured to output information and a second interface configured to obtain information. In some implementations, the first interface may refer to an interface between the processing system of the chip or modem and a transmitter, such that the device 905 may transmit information output from the chip or modem. In some implementations, the second interface may refer to an interface between the processing system of the chip or modem and a receiver, such that the device 905 may obtain information or signal inputs, and the information may be passed to the processing system. A person having ordinary skill in the art will readily recognize that the first interface also may obtain information or signal inputs, and the second interface also may output information or signal outputs. As such, one or more interfaces may refer to a single interface configured to output information and obtain information or may refer to multiple interfaces including one interface configured to at least output information and another interface configured to at least obtain information.

The inter-station communications manager 945 may manage communications with other APs 105, and may include a controller or scheduler for controlling communications with STAs 115 in cooperation with other APs 105. For example, the inter-station communications manager 945 may coordinate scheduling for transmissions to APs 105 for various interference mitigation techniques such as beamforming or joint transmission.

The communications manager 920 may support wireless communications at a first MLD in accordance with examples as disclosed herein. For example, the communications manager 920 may be configured as or otherwise support a means for transmitting, via a first radio frequency link, identifying information associated with a second radio frequency link in accordance with a multi-link operation between a second MLD and the first MLD. The communications manager 920 may be configured as or otherwise support a means for transmitting, via the first radio frequency link, control information associated with communications using the second radio frequency link, where the communications using the second radio frequency link are associated with a configuration for directional transmissions between the first MLD and the second MLD. The communications manager 920 may be configured as or otherwise support a means for communicating, with the second MLD via the second radio frequency link, one or more data messages in accordance with the control information.

In some implementations, to support transmitting the identifying information associated with the second radio frequency link, the communications manager 920 may be configured as or otherwise support a means for transmitting, via an RNR element carried in a beacon frame or a probe response frame associated with the first radio frequency link, an indication of a restriction associated with use of the second radio frequency link. In some implementations, to support transmitting the identifying information associated with the second radio frequency link, the communications manager 920 may be configured as or otherwise support a means for transmitting, via a multi-link probe response, an indication of a condition associated with the use of the second radio frequency link, where a setup of the second radio frequency link is associated with a satisfaction of the condition.

In some implementations, the communications manager 920 may be configured as or otherwise support a means for transmitting, via the first radio frequency link, a first multi-link reconfiguration message associated with an addition of the second radio frequency link to a multi-link setup between the second MLD and the first MLD in accordance with the satisfaction of the condition. In some implementations, the communications manager 920 may be configured as or otherwise support a means for transmitting, via the first radio frequency link or the second radio frequency link, a second multi-link reconfiguration message associated with a removal of the second radio frequency link from the multi-link setup between the second MLD and the first MLD in accordance with the condition no longer being satisfied.

In some implementations, the addition of the second radio frequency link and the removal of the second radio frequency link are specific to the second MLD.

In some implementations, the communications manager 920 may be configured as or otherwise support a means for transmitting, via the first radio frequency link, timing information corresponding to first communications using the first radio frequency link and a time domain offset between a first timing synchronization function of the first radio frequency link and a second timing synchronization function of the second radio frequency link, where a timing of the one or more data messages communicated via the second radio frequency link is associated with the timing information and the time domain offset.

In some implementations, the communications manager 920 may be configured as or otherwise support a means for receiving, via the first radio frequency link, at least one of feedback information associated with at least one of the one or more data messages communicated via the second radio frequency link, a status of a set of operating conditions associated with the second radio frequency link, an indication of changes to the set of operating conditions associated with the second radio frequency link, or a response to a query received via the second radio frequency link.

In some implementations, to support transmitting the identifying information associated with the second radio frequency link, the communications manager 920 may be configured as or otherwise support a means for transmitting at least one of a multi-link probe response frame, an association frame, or an RNR element including the identifying information.

In some implementations, to support transmitting the control information associated with the communications using the second radio frequency link, the communications manager 920 may be configured as or otherwise support a means for transmitting, via the first radio frequency link, one or more management frames including information which includes at least one of a duration of a BI, timing information, a traffic indication, information associated with a service period of the second radio frequency link, an indication of a critical update to one or more operational parameters associated with the second radio frequency link, or a set of operational parameters associated with the second radio frequency link, or any combination thereof.

In some implementations, the communications manager 920 may be configured as or otherwise support a means for transmitting, via the second radio frequency link, a beacon frame including the set of operational parameters associated with the second radio frequency link in accordance with transmitting the indication of the critical update to the one or more operational parameters associated with the second radio frequency link via the one or more beacon frames.

In some implementations, the one or more management frames include a beacon frame, a probe response frame, a multi-link probe response, an association response frame, or a reassociation response frame.

In some implementations, the communications manager 920 may be configured as or otherwise support a means for transmitting, via the first radio frequency link, one or more individually addressed management frames associated with the second radio frequency link.

In some implementations, the communications manager 920 may be configured as or otherwise support a means for transmitting, via the second radio frequency link, a beacon frame in accordance with a satisfaction of a condition, where the beacon frame is associated with a beam training at the second MLD.

In some implementations, the communications manager 920 may be configured as or otherwise support a means for transmitting, via the first radio frequency link, information indicating that beacon frames on the second radio frequency link are on-demand. In some implementations, the communications manager 920 may be configured as or otherwise support a means for receiving, via the first radio frequency link or the second radio frequency link, a request for the beacon frame on the second radio frequency link, where the satisfaction of the condition is associated with the request for the beacon frame.

In some implementations, the satisfaction of the condition is associated with a topology around the second MLD, a high-mobility configuration of the second MLD, a signal strength measurement at the second MLD being below a threshold signal strength measurement, a frequency of beam training on the second radio frequency link, or an indication of a presence of the beacon frame on the second radio frequency link via a management frame transmitted on the first radio frequency link.

In some implementations, the communications manager 920 may be configured as or otherwise support a means for receiving, via the first radio frequency link, an indication of one or more ranging measurements or one or more radio frequency measurements, or both, where receiving the indication of the one or more ranging measurements or the one or more radio frequency measurements, or both, is associated with an absence of a beacon frame from the second radio frequency link.

In some implementations, the communications manager 920 may be configured as or otherwise support a means for transmitting an indication that a beacon frame is absent from a beacon interval of the second radio frequency link, where the one or more data messages are communicated during a beacon transmit interval associated with the beacon frame in accordance with the indication that the beacon frame is absent.

In some implementations, the communications manager 920 may be configured as or otherwise support a means for receiving an indication of a directionality constraint associated with the first radio frequency link and the second radio frequency link, where the directionality constraint indicates an election by the second MLD to support uplink or downlink, or both, using the first radio frequency link and to support uplink or downlink, or both, using the second radio frequency link.

In some implementations, the first radio frequency link is a sub-7 GHz link and the second radio frequency link is a 60 GHz link or a 45 GHz link.

Figure 10:
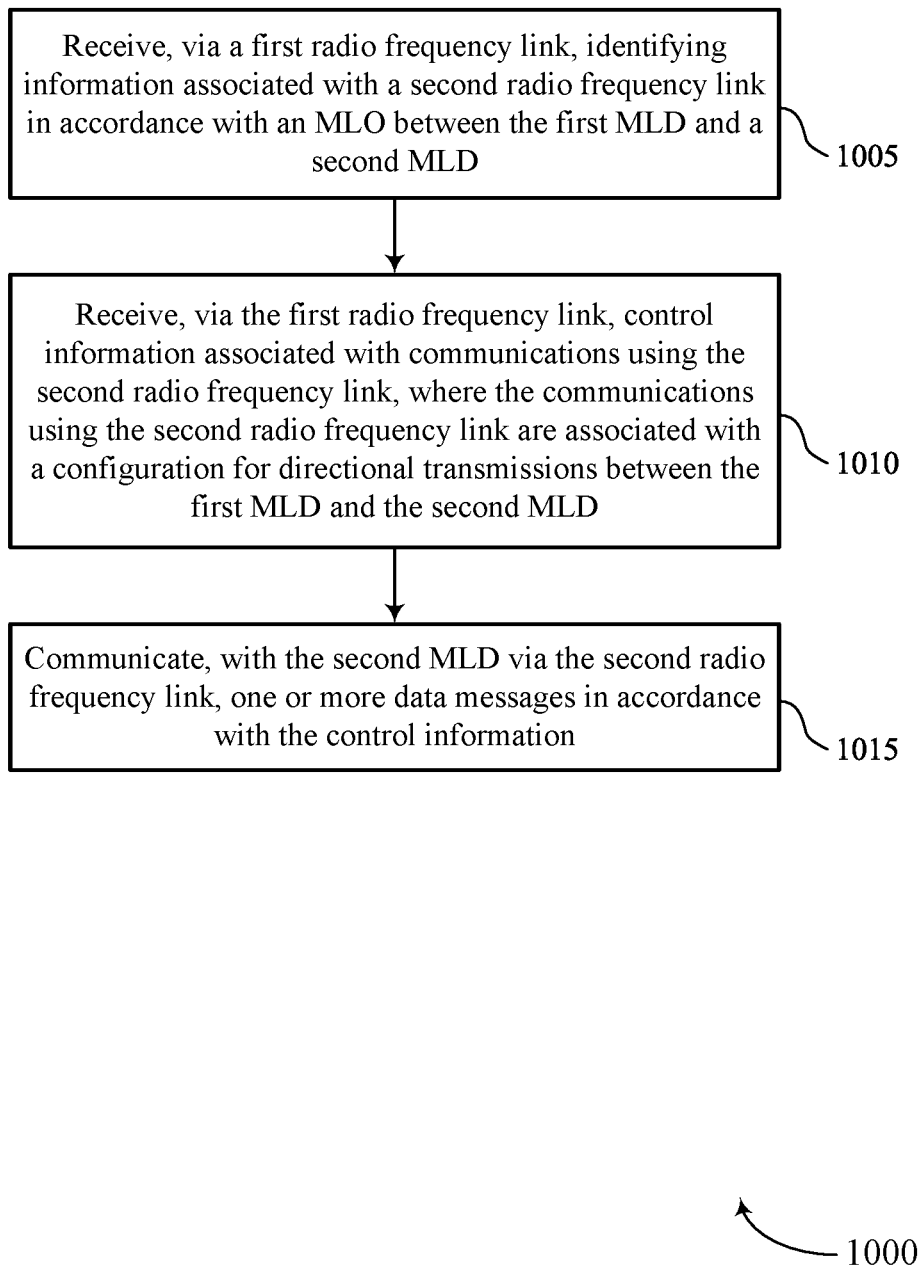
FIGS. 10 and 11 show flowcharts illustrating example methods that support high frequency multi-link support systems operation.

FIG. 10 shows a flowchart illustrating an example method 1000 that supports high frequency multi-link support systems operation. The operations of the method 1000 may be implemented by an STA or its components as described herein. For example, the operations of the method 1000 may be performed by an STA as described with reference to FIGS. 1-8. In some implementations, an STA may execute a set of instructions to control the functional elements of the STA to perform the described functions. Additionally, or alternatively, the STA may perform aspects of the described functions using special-purpose hardware.

At 1005, the method may include receiving, via a first radio frequency link, identifying information associated with a second radio frequency link in accordance with a multi-link operation between the first MLD and a second MLD. The operations of 1005 may be performed in accordance with examples as disclosed herein.

At 1010, the method may include receiving, via the first radio frequency link, control information associated with communications using the second radio frequency link, where the communications using the second radio frequency link are associated with a configuration for directional transmissions between the first MLD and the second MLD. The operations of 1010 may be performed in accordance with examples as disclosed herein.

At 1015, the method may include communicating, with the second MLD via the second radio frequency link, one or more data messages in accordance with the control information. The operations of 1015 may be performed in accordance with examples as disclosed herein.

Figure 11:
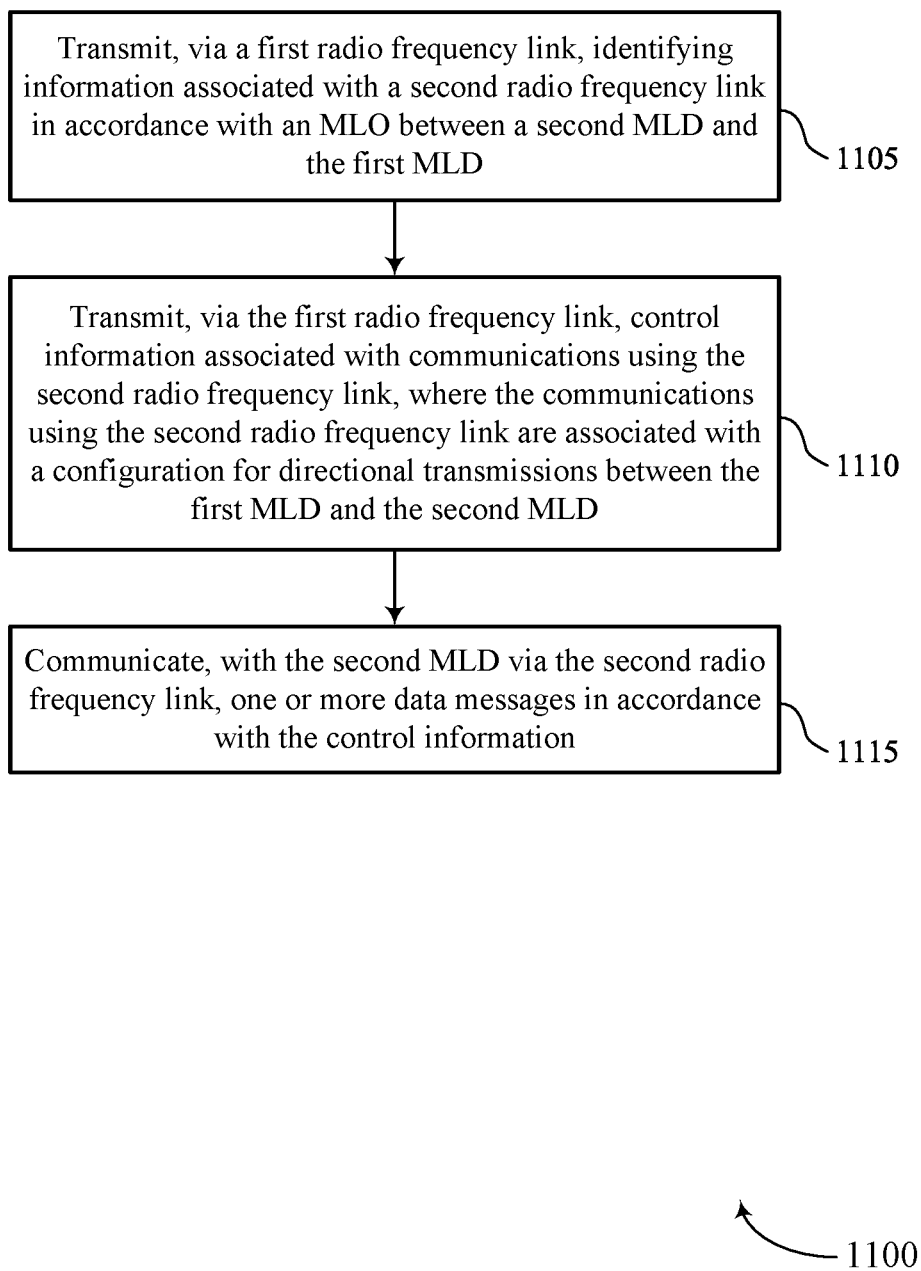

FIG. 11 shows a flowchart illustrating an example method 1100 that supports high frequency multi-link support systems operation. The operations of the method 1100 may be implemented by an AP or its components as described herein. For example, the operations of the method 1100 may be performed by an AP as described with reference to FIGS. 1-7 and 9. In some implementations, an AP may execute a set of instructions to control the functional elements of the AP to perform the described functions. Additionally, or alternatively, the AP may perform aspects of the described functions using special-purpose hardware.

At 1105, the method may include transmitting, via a first radio frequency link, identifying information associated with a second radio frequency link in accordance with a multi-link operation between a second MLD and the first MLD. The operations of 1105 may be performed in accordance with examples as disclosed herein.

At 1110, the method may include transmitting, via the first radio frequency link, control information associated with communications using the second radio frequency link, where the communications using the second radio frequency link are associated with a configuration for directional transmissions between the first MLD and the second MLD. The operations of 1110 may be performed in accordance with examples as disclosed herein.

At 1115, the method may include communicating, with the second MLD via the second radio frequency link, one or more data messages in accordance with the control information. The operations of 1115 may be performed in accordance with examples as disclosed herein.

The following provides an overview of some aspects of the present disclosure:

Aspect 1: An apparatus for wireless communications at a first MLD, including: one or more interfaces configured to: obtain, via a first radio frequency link, identifying information associated with a second radio frequency link in accordance with a multi-link operation between the first MLD and a second MLD; obtain, via the first radio frequency link, control information associated with communications using the second radio frequency link, where the communications using the second radio frequency link are associated with a configuration for directional transmissions between the first MLD and the second MLD; and output, to the second MLD via the second radio frequency link, one or more data messages in accordance with the control information.

Aspect 2: The apparatus of aspect 1, where, to obtain the identifying information associated with the second radio frequency link, the one or more interfaces are further configured to: obtain, via an RNR element carried in a beacon frame or a probe response frame associated with the first radio frequency link, an indication of a restriction associated with use of the second radio frequency link; and obtain, via a multi-link probe response, an indication of a condition associated with the use of the second radio frequency link, where a setup of the second radio frequency link is associated with a satisfaction of the condition.

Aspect 3: The apparatus of aspect 2, where the one or more interfaces are further configured to: obtain, via the first radio frequency link, a first multi-link reconfiguration message associated with an addition of the second radio frequency link to a multi-link setup between the first MLD and the second MLD in accordance with the satisfaction of the condition; and obtain, via the first radio frequency link or the second radio frequency link, a second multi-link reconfiguration message associated with a removal of the second radio frequency link from the multi-link setup between the first MLD and the second MLD in accordance with the condition no longer being satisfied.

Aspect 4: The apparatus of aspect 3, where the addition of the second radio frequency link and the removal of the second radio frequency link are specific to the first MLD.

Aspect 5: The apparatus of any of aspects 1-4, where the one or more interfaces are further configured to: obtain, via the first radio frequency link, timing information corresponding to first communications using the first radio frequency link and a time domain offset between a first timing synchronization function of the first radio frequency link and a second timing synchronization function of the second radio frequency link, where a timing of the one or more data messages output via the second radio frequency link is associated with the timing information and the time domain offset.

Aspect 6: The apparatus of any of aspects 1-5, where the one or more interfaces are further configured to: output, via the first radio frequency link, at least one of feedback information associated with at least one of the one or more data messages output via the second radio frequency link, a status of a set of operating conditions associated with the second radio frequency link, an indication of changes to the set of operating conditions associated with the second radio frequency link, or a response to a query received via the second radio frequency link.

Aspect 7: The apparatus of any of aspects 1-6, where, to obtain the identifying information associated with the second radio frequency link, the one or more interfaces are further configured to: obtain at least one of a multi-link probe response frame, an association frame, or an RNR element including the identifying information.

Aspect 8: The apparatus of any of aspects 1-7, where, to obtain the control information associated with the communications using the second radio frequency link, the one or more interfaces are further configured to: obtain, via the first radio frequency link, one or more management frames including information which includes at least one of a duration of a BI, timing information, a traffic indication, information associated with a service period of the second radio frequency link, an indication of a critical update to one or more operational parameters associated with the second radio frequency link, or a set of operational parameters associated with the second radio frequency link, or any combination thereof.

Aspect 9: The apparatus of aspect 8, where the one or more interfaces are further configured to: monitor the second radio frequency link for a beacon frame including the set of operational parameters associated with the second radio frequency link in accordance with receiving the indication of the critical update to the one or more operational parameters associated with the second radio frequency link via the one or more beacon frames.

Aspect 10: The apparatus of any of aspects 8-9, where the one or more management frames include a beacon frame, a probe response frame, a multi-link probe response, an association response frame, or a reassociation response frame.

Aspect 11: The apparatus of any of aspects 1-10, where the one or more interfaces are further configured to: obtain, via the first radio frequency link, one or more individually addressed management frames associated with the second radio frequency link.

Aspect 12: The apparatus of any of aspects 1-11, where the one or more interfaces are further configured to: obtain, via the second radio frequency link, a beacon frame in accordance with a satisfaction of a condition, where the beacon frame is associated with a beam training at the first MLD.

Aspect 13: The apparatus of aspect 12, where the one or more interfaces are further configured to: obtain, via the first radio frequency link, information indicating that beacon frames on the second radio frequency link are on-demand; and obtain, via the first radio frequency link or the second radio frequency link, a request for the beacon frame on the second radio frequency link, where the satisfaction of the condition is associated with the request for the beacon frame.

Aspect 14: The apparatus of any of aspects 12-13, where the satisfaction of the condition is associated with a topology around the first MLD, a high-mobility configuration of the first MLD, a signal strength measurement at the first MLD being below a threshold signal strength measurement, a frequency of beam training on the second radio frequency link, or an indication of a presence of the beacon frame on the second radio frequency link via a management frame received on the first radio frequency link.

Aspect 15: The apparatus of any of aspects 1-11, where: a processing system is configured to: perform one or more ranging measurements or one or more radio frequency measurements, or both, using the first radio frequency link; and the one or more interfaces are further configured to: output, via the first radio frequency link, an indication of the one or more ranging measurements or the one or more radio frequency measurements, or both, where performing the one or more ranging measurements or the one or more radio frequency measurements, or both, is associated with an absence of a beacon frame from the second radio frequency link.

Aspect 16: The apparatus of any of aspects 1-11 or 15, where the one or more interfaces are further configured to: obtain an indication that a beacon frame is absent from a beacon interval of the second radio frequency link, where the one or more data messages are output during a beacon transmit interval associated with the beacon frame in accordance with the indication that the beacon frame is absent.

Aspect 17: The apparatus of any of aspects 1-16, where the one or more interfaces are further configured to: output an indication of a directionality constraint associated with the first radio frequency link and the second radio frequency link, where the directionality constraint indicates an election by the first MLD to support uplink or downlink, or both, using the first radio frequency link and to support uplink or downlink, or both, using the second radio frequency link.

Aspect 18: The apparatus of any of aspects 1-17, where the first MLD functions as a soft AP MLD, and the soft AP MLD uses a same set of radio frequency chains as the first MLD.

Aspect 19: The apparatus of aspect 18, where the one or more interfaces are further configured to: output, via the first radio frequency link and using a first AP that is affiliated with the soft AP MLD, the identifying information and the control information associated with the second radio frequency link.

Aspect 20: The apparatus of any of aspects 1-19, where the first radio frequency link is a sub-7 GHz link and the second radio frequency link is a 60 GHz link or a 45 GHz link.

Aspect 21: An apparatus for wireless communications at a first MLD, including: one or more interfaces configured to: output, via a first radio frequency link, identifying information associated with a second radio frequency link in accordance with a multi-link operation between a second MLD and the first MLD; output, via the first radio frequency link, control information associated with communications using the second radio frequency link, where the communications using the second radio frequency link are associated with a configuration for directional transmissions between the first MLD and the second MLD; and obtain, from the second MLD via the second radio frequency link, one or more data messages in accordance with the control information.

Aspect 22: The apparatus of aspect 21, where, to output the identifying information associated with the second radio frequency link, the one or more interfaces are further configured to: output, via an RNR element carried in a beacon frame or a probe response frame associated with the first radio frequency link, an indication of a restriction associated with use of the second radio frequency link; and output, via a multi-link probe response, an indication of a condition associated with the use of the second radio frequency link, where a setup of the second radio frequency link is associated with a satisfaction of the condition.

Aspect 23: The apparatus of aspect 22, where the one or more interfaces are further configured to: output, via the first radio frequency link, a first multi-link reconfiguration message associated with an addition of the second radio frequency link to a multi-link setup between the second MLD and the first MLD in accordance with the satisfaction of the condition; and output, via the first radio frequency link or the second radio frequency link, a second multi-link reconfiguration message associated with a removal of the second radio frequency link from the multi-link setup between the second MLD and the first MLD in accordance with the condition no longer being satisfied.

Aspect 24: The apparatus of aspect 23, where the addition of the second radio frequency link and the removal of the second radio frequency link are specific to the second MLD.

Aspect 25: The apparatus of any of aspects 21-24, where the one or more interfaces are further configured to: output, via the first radio frequency link, timing information corresponding to first communications using the first radio frequency link and a time domain offset between a first timing synchronization function of the first radio frequency link and a second timing synchronization function of the second radio frequency link, where a timing of the one or more data messages obtained via the second radio frequency link is associated with the timing information and the time domain offset.

Aspect 26: The apparatus of any of aspects 21-25, where the one or more interfaces are further configured to: obtain, via the first radio frequency link, at least one of feedback information associated with at least one of the one or more data messages obtained via the second radio frequency link, a status of a set of operating conditions associated with the second radio frequency link, an indication of changes to the set of operating conditions associated with the second radio frequency link, or a response to a query received via the second radio frequency link.

Aspect 27: The apparatus of any of aspects 21-26, where, to output the identifying information associated with the second radio frequency link, the one or more interfaces are further configured to: output at least one of a multi-link probe response frame, an association frame, or an RNR element including the identifying information.

Aspect 28: The apparatus of any of aspects 21-27, where, to output the control information associated with the communications using the second radio frequency link, the one or more interfaces are further configured to: output, via the first radio frequency link, one or more management frames including information which includes at least one of a duration of a BI, timing information, a traffic indication, information associated with a service period of the second radio frequency link, an indication of a critical update to one or more operational parameters associated with the second radio frequency link, or a set of operational parameters associated with the second radio frequency link, or any combination thereof.

Aspect 29: The apparatus of aspect 28, where the one or more interfaces are further configured to: output, via the second radio frequency link, a beacon frame including the set of operational parameters associated with the second radio frequency link in accordance with transmitting the indication of the critical update to the one or more operational parameters associated with the second radio frequency link via the one or more beacon frames.

Aspect 30: The apparatus of any of aspects 28-29, where the one or more management frames include a beacon frame, a probe response frame, a multi-link probe response, an association response frame, or a reassociation response frame.

Aspect 31: The apparatus of any of aspects 21-30, where the one or more interfaces are further configured to: output, via the first radio frequency link, one or more individually addressed management frames associated with the second radio frequency link.

Aspect 32: The apparatus of any of aspects 21-31, where the one or more interfaces are further configured to: output, via the second radio frequency link, a beacon frame in accordance with a satisfaction of a condition, where the beacon frame is associated with a beam training at the second MLD.

Aspect 33: The apparatus of aspect 32, where the one or more interfaces are further configured to: output, via the first radio frequency link, information indicating that beacon frames on the second radio frequency link are on-demand; and obtain, via the first radio frequency link or the second radio frequency link, a request for the beacon frame on the second radio frequency link, where the satisfaction of the condition is associated with the request for the beacon frame.

Aspect 34: The apparatus of any of aspects 32-33, where the satisfaction of the condition is associated with a topology around the second MLD, a high-mobility configuration of the second MLD, a signal strength measurement at the second MLD being below a threshold signal strength measurement, a frequency of beam training on the second radio frequency link, or an indication of a presence of the beacon frame on the second radio frequency link via a management frame transmitted on the first radio frequency link.

Aspect 35: The apparatus of any of aspects 21-31, where the one or more interfaces are further configured to: obtain, via the first radio frequency link, an indication of one or more ranging measurements or one or more radio frequency measurements, or both, where receiving the indication of the one or more ranging measurements or the one or more radio frequency measurements, or both, is associated with an absence of a beacon frame from the second radio frequency link.

Aspect 36: The apparatus of any of aspects 21-31 or 35, where the one or more interfaces are further configured to: output an indication that a beacon frame is absent from a beacon interval of the second radio frequency link, where the one or more data messages are obtained during a beacon transmit interval associated with the beacon frame in accordance with the indication that the beacon frame is absent.

Aspect 37: The apparatus of any of aspects 21-36, where the one or more interfaces are further configured to: obtain an indication of a directionality constraint associated with the first radio frequency link and the second radio frequency link, where the directionality constraint indicates an election by the second MLD to support uplink or downlink, or both, using the first radio frequency link and to support uplink or downlink, or both, using the second radio frequency link.

Aspect 38: The apparatus of any of aspects 21-37, where the first radio frequency link is a sub-7 GHz link and the second radio frequency link is a 60 GHz link or a 45 GHz link.

Aspect 39: A method for wireless communications at a first MLD, including: receiving, via a first radio frequency link, identifying information associated with a second radio frequency link in accordance with a multi-link operation between the first MLD and a second MLD; receiving, via the first radio frequency link, control information associated with communications using the second radio frequency link, where the communications using the second radio frequency link are associated with a configuration for directional transmissions between the first MLD and the second MLD; and communicating, with the second MLD via the second radio frequency link, one or more data messages in accordance with the control information.

Aspect 40: The method of aspect 39, where receiving the identifying information associated with the second radio frequency link includes: receiving, via an RNR element carried in a beacon frame or a probe response frame associated with the first radio frequency link, an indication of a restriction associated with use of the second radio frequency link; and receiving, via a multi-link probe response, an indication of a condition associated with the use of the second radio frequency link, where a setup of the second radio frequency link is associated with a satisfaction of the condition.

Aspect 41: The method of aspect 40, further including: receiving, via the first radio frequency link, a first multi-link reconfiguration message associated with an addition of the second radio frequency link to a multi-link setup between the first MLD and the second MLD in accordance with the satisfaction of the condition; and receiving, via the first radio frequency link or the second radio frequency link, a second multi-link reconfiguration message associated with a removal of the second radio frequency link from the multi-link setup between the first MLD and the second MLD in accordance with the condition no longer being satisfied.

Aspect 42: The method of aspect 41, where the addition of the second radio frequency link and the removal of the second radio frequency link are specific to the first MLD.

Aspect 43: The method of any of aspects 39-42, further including: receiving, via the first radio frequency link, timing information corresponding to first communications using the first radio frequency link and a time domain offset between a first timing synchronization function of the first radio frequency link and a second timing synchronization function of the second radio frequency link, where a timing of the one or more data messages communicated via the second radio frequency link is associated with the timing information and the time domain offset.

Aspect 44: The method of any of aspects 39-43, further including: transmitting, via the first radio frequency link, at least one of feedback information associated with at least one of the one or more data messages communicated via the second radio frequency link, a status of a set of operating conditions associated with the second radio frequency link, an indication of changes to the set of operating conditions associated with the second radio frequency link, or a response to a query received via the second radio frequency link.

Aspect 45: The method of any of aspects 39-44, where receiving the identifying information associated with the second radio frequency link includes: receiving at least one of a multi-link probe response frame, an association frame, or an RNR element including the identifying information.

Aspect 46: The method of any of aspects 39-45, where receiving the control information associated with the communications using the second radio frequency link includes: receiving, via the first radio frequency link, one or more management frames including information which includes at least one of a duration of a BI, timing information, a traffic indication, information associated with a service period of the second radio frequency link, an indication of a critical update to one or more operational parameters associated with the second radio frequency link, or a set of operational parameters associated with the second radio frequency link, or any combination thereof.

Aspect 47: The method of aspect 46, further including: monitoring the second radio frequency link for a beacon frame including the set of operational parameters associated with the second radio frequency link in accordance with receiving the indication of the critical update to the one or more operational parameters associated with the second radio frequency link via the one or more beacon frames.

Aspect 48: The method of any of aspects 46-47, where the one or more management frames include a beacon frame, a probe response frame, a multi-link probe response, an association response frame, or a reassociation response frame.

Aspect 49: The method of any of aspects 39-48, further including: receiving, via the first radio frequency link, one or more individually addressed management frames associated with the second radio frequency link.

Aspect 50: The method of any of aspects 39-49, further including: receiving, via the second radio frequency link, a beacon frame in accordance with a satisfaction of a condition, where the beacon frame is associated with a beam training at the first MLD.

Aspect 51: The method of aspect 50, further including: receiving, via the first radio frequency link, information indicating that beacon frames on the second radio frequency link are on-demand; and transmitting, via the first radio frequency link or the second radio frequency link, a request for the beacon frame on the second radio frequency link, where the satisfaction of the condition is associated with the request for the beacon frame.

Aspect 52: The method of any of aspects 50-51, where the satisfaction of the condition is associated with a topology around the first MLD, a high-mobility configuration of the first MLD, a signal strength measurement at the first MLD being below a threshold signal strength measurement, a frequency of beam training on the second radio frequency link, or an indication of a presence of the beacon frame on the second radio frequency link via a management frame received on the first radio frequency link.

Aspect 53: The method of any of aspects 39-49, further including: performing one or more ranging measurements or one or more radio frequency measurements, or both, using the first radio frequency link; and transmitting, via the first radio frequency link, an indication of the one or more ranging measurements or the one or more radio frequency measurements, or both, where performing the one or more ranging measurements or the one or more radio frequency measurements, or both, is associated with an absence of a beacon frame from the second radio frequency link.

Aspect 54: The method of any of aspects 39-49 or 53, further including: receiving an indication that a beacon frame is absent from a beacon interval of the second radio frequency link, where the one or more data messages are communicated during a beacon transmit interval associated with the beacon frame in accordance with the indication that the beacon frame is absent.

Aspect 55: The method of any of aspects 39-54, further including: transmitting an indication of a directionality constraint associated with the first radio frequency link and the second radio frequency link, where the directionality constraint indicates an election by the first MLD to support uplink or downlink, or both, using the first radio frequency link and to support uplink or downlink, or both, using the second radio frequency link.

Aspect 56: The method of any of aspects 39-55, where the first MLD functions as a soft AP MLD, the soft AP MLD uses a same set of radio frequency chains as the first MLD.

Aspect 57: The method of aspect 56, further including: transmitting, via the first radio frequency link and using a first AP that is affiliated with the soft AP MLD, the identifying information and the control information associated with the second radio frequency link.

Aspect 58: The method of any of aspects 39-57, where the first radio frequency link is a sub-7 GHz link and the second radio frequency link is a 60 GHz link or a 45 GHz link.

Aspect 59: A method for wireless communications at a first MLD, including: transmitting, via a first radio frequency link, identifying information associated with a second radio frequency link in accordance with a multi-link operation between a second MLD and the first MLD; transmitting, via the first radio frequency link, control information associated with communications using the second radio frequency link, where the communications using the second radio frequency link are associated with a configuration for directional transmissions between the first MLD and the second MLD; and communicating, with the second MLD via the second radio frequency link, one or more data messages in accordance with the control information.

Aspect 60: The method of aspect 59, where transmitting the identifying information associated with the second radio frequency link includes: transmitting, via an RNR element carried in a beacon frame or a probe response frame associated with the first radio frequency link, an indication of a restriction associated with use of the second radio frequency link; and transmitting, via a multi-link probe response, an indication of a condition associated with the use of the second radio frequency link, where a setup of the second radio frequency link is associated with a satisfaction of the condition.

Aspect 61: The method of aspect 60, further including: transmitting, via the first radio frequency link, a first multi-link reconfiguration message associated with an addition of the second radio frequency link to a multi-link setup between the second MLD and the first MLD in accordance with the satisfaction of the condition; and transmitting, via the first radio frequency link or the second radio frequency link, a second multi-link reconfiguration message associated with a removal of the second radio frequency link from the multi-link setup between the second MLD and the first MLD in accordance with the condition no longer being satisfied.

Aspect 62: The method of aspect 61, where the addition of the second radio frequency link and the removal of the second radio frequency link are specific to the second MLD.

Aspect 63: The method of any of aspects 59-62, further including: transmitting, via the first radio frequency link, timing information corresponding to first communications using the first radio frequency link and a time domain offset between a first timing synchronization function of the first radio frequency link and a second timing synchronization function of the second radio frequency link, where a timing of the one or more data messages communicated via the second radio frequency link is associated with the timing information and the time domain offset.

Aspect 64: The method of any of aspects 59-63, further including: receiving, via the first radio frequency link, at least one of feedback information associated with at least one of the one or more data messages communicated via the second radio frequency link, a status of a set of operating conditions associated with the second radio frequency link, an indication of changes to the set of operating conditions associated with the second radio frequency link, or a response to a query received via the second radio frequency link.

Aspect 65: The method of any of aspects 59-64, where transmitting the identifying information associated with the second radio frequency link includes: transmitting at least one of a multi-link probe response frame, an association frame, or an RNR element including the identifying information.

Aspect 66: The method of any of aspects 59-65, where transmitting the control information associated with the communications using the second radio frequency link includes: transmitting, via the first radio frequency link, one or more management frames including information which includes at least one of a duration of a BI, timing information, a traffic indication, information associated with a service period of the second radio frequency link, an indication of a critical update to one or more operational parameters associated with the second radio frequency link, or a set of operational parameters associated with the second radio frequency link, or any combination thereof.

Aspect 67: The method of aspect 66, further including: transmitting, via the second radio frequency link, a beacon frame including the set of operational parameters associated with the second radio frequency link in accordance with transmitting the indication of the critical update to the one or more operational parameters associated with the second radio frequency link via the one or more beacon frames.

Aspect 68: The method of any of aspects 66-67, where the one or more management frames include a beacon frame, a probe response frame, a multi-link probe response, an association response frame, or a reassociation response frame.

Aspect 69: The method of any of aspects 59-68, further including: transmitting, via the first radio frequency link, one or more individually addressed management frames associated with the second radio frequency link.

Aspect 70: The method of any of aspects 59-69, further including: transmitting, via the second radio frequency link, a beacon frame in accordance with a satisfaction of a condition, where the beacon frame is associated with a beam training at the second MLD.

Aspect 71: The method of aspect 70, further including: transmitting, via the first radio frequency link, information indicating that beacon frames on the second radio frequency link are on-demand; and receiving, via the first radio frequency link or the second radio frequency link, a request for the beacon frame on the second radio frequency link, where the satisfaction of the condition is associated with the request for the beacon frame.

Aspect 72: The method of any of aspects 70-71, where the satisfaction of the condition is associated with a topology around the second MLD, a high-mobility configuration of the second MLD, a signal strength measurement at the second MLD being below a threshold signal strength measurement, a frequency of beam training on the second radio frequency link, or an indication of a presence of the beacon frame on the second radio frequency link via a management frame transmitted on the first radio frequency link.

Aspect 73: The method of any of aspects 59-69, further including: receiving, via the first radio frequency link, an indication of one or more ranging measurements or one or more radio frequency measurements, or both, where receiving the indication of the one or more ranging measurements or the one or more radio frequency measurements, or both, is associated with an absence of a beacon frame from the second radio frequency link.

Aspect 74: The method of any of aspects 59-69 or 73, further including: transmitting an indication that a beacon frame is absent from a beacon interval of the second radio frequency link, where the one or more data messages are communicated during a beacon transmit interval associated with the beacon frame in accordance with the indication that the beacon frame is absent.

Aspect 75: The method of any of aspects 59-74, further including: receiving an indication of a directionality constraint associated with the first radio frequency link and the second radio frequency link, where the directionality constraint indicates an election by the second MLD to support uplink or downlink, or both, using the first radio frequency link and to support uplink or downlink, or both, using the second radio frequency link.

Aspect 76: The method of any of aspects 59-75, where the first radio frequency link is a sub-7 GHz link and the second radio frequency link is a 60 GHz link or a 45 GHz link.

Aspect 77: An apparatus for wireless communications at a first MLD, including: means for receiving, via a first radio frequency link, identifying information associated with a second radio frequency link in accordance with a multi-link operation between the first MLD and a second MLD; means for receiving, via the first radio frequency link, control information associated with communications using the second radio frequency link, where the communications using the second radio frequency link are associated with a configuration for directional transmissions between the first MLD and the second MLD; and means for communicating, with the second MLD via the second radio frequency link, one or more data messages in accordance with the control information.

Aspect 78: The apparatus of aspect 77, where the means for receiving the identifying information associated with the second radio frequency link include: means for receiving, via an RNR element carried in a beacon frame or a probe response frame associated with the first radio frequency link, an indication of a restriction associated with use of the second radio frequency link; and means for receiving, via a multi-link probe response, an indication of a condition associated with the use of the second radio frequency link, where a setup of the second radio frequency link is associated with a satisfaction of the condition.

Aspect 79: The apparatus of aspect 78, further including: means for receiving, via the first radio frequency link, a first multi-link reconfiguration message associated with an addition of the second radio frequency link to a multi-link setup between the first MLD and the second MLD in accordance with the satisfaction of the condition; and means for receiving, via the first radio frequency link or the second radio frequency link, a second multi-link reconfiguration message associated with a removal of the second radio frequency link from the multi-link setup between the first MLD and the second MLD in accordance with the condition no longer being satisfied.

Aspect 80: The apparatus of aspect 79, where the addition of the second radio frequency link and the removal of the second radio frequency link are specific to the first MLD.

Aspect 81: The apparatus of any of aspects 77-80, further including: means for receiving, via the first radio frequency link, timing information corresponding to first communications using the first radio frequency link and a time domain offset between a first timing synchronization function of the first radio frequency link and a second timing synchronization function of the second radio frequency link, where a timing of the one or more data messages communicated via the second radio frequency link is associated with the timing information and the time domain offset.

Aspect 82: The apparatus of any of aspects 77-81, further including: means for transmitting, via the first radio frequency link, at least one of feedback information associated with at least one of the one or more data messages communicated via the second radio frequency link, a status of a set of operating conditions associated with the second radio frequency link, an indication of changes to the set of operating conditions associated with the second radio frequency link, or a response to a query received via the second radio frequency link.

Aspect 83: The apparatus of any of aspects 77-82, where the means for receiving the identifying information associated with the second radio frequency link include: means for receiving at least one of a multi-link probe response frame, an association frame, or an RNR element including the identifying information.

Aspect 84: The apparatus of any of aspects 77-83, where the means for receiving the control information associated with the communications using the second radio frequency link include: means for receiving, via the first radio frequency link, one or more management frames including information which includes at least one of a duration of a BI, timing information, a traffic indication, information associated with a service period of the second radio frequency link, an indication of a critical update to one or more operational parameters associated with the second radio frequency link, or a set of operational parameters associated with the second radio frequency link, or any combination thereof.

Aspect 85: The apparatus of aspect 84, further including: means for monitoring the second radio frequency link for a beacon frame including the set of operational parameters associated with the second radio frequency link in accordance with receiving the indication of the critical update to the one or more operational parameters associated with the second radio frequency link via the one or more beacon frames.

Aspect 86: The apparatus of any of aspects 84-85, where the one or more management frames include a beacon frame, a probe response frame, a multi-link probe response, an association response frame, or a reassociation response frame.

Aspect 87: The apparatus of any of aspects 77-86, further including: means for receiving, via the first radio frequency link, one or more individually addressed management frames associated with the second radio frequency link.

Aspect 88: The apparatus of any of aspects 77-87, further including: means for receiving, via the second radio frequency link, a beacon frame in accordance with a satisfaction of a condition, where the beacon frame is associated with a beam training at the first MLD.

Aspect 89: The apparatus of aspect 88, further including: means for receiving, via the first radio frequency link, information indicating that beacon frames on the second radio frequency link are on-demand; and means for transmitting, via the first radio frequency link or the second radio frequency link, a request for the beacon frame on the second radio frequency link, where the satisfaction of the condition is associated with the request for the beacon frame.

Aspect 90: The apparatus of any of aspects 88-89, where the satisfaction of the condition is associated with a topology around the first MLD, a high-mobility configuration of the first MLD, a signal strength measurement at the first MLD being below a threshold signal strength measurement, a frequency of beam training on the second radio frequency link, or an indication of a presence of the beacon frame on the second radio frequency link via a management frame received on the first radio frequency link.

Aspect 91: The apparatus of any of aspects 77-87, further including: means for performing one or more ranging measurements or one or more radio frequency measurements, or both, using the first radio frequency link; and means for transmitting, via the first radio frequency link, an indication of the one or more ranging measurements or the one or more radio frequency measurements, or both, where performing the one or more ranging measurements or the one or more radio frequency measurements, or both, is associated with an absence of a beacon frame from the second radio frequency link.

Aspect 92: The apparatus of any of aspects 77-87 or 91, further including: means for receiving an indication that a beacon frame is absent from a beacon interval of the second radio frequency link, where the one or more data messages are communicated during a beacon transmit interval associated with the beacon frame in accordance with the indication that the beacon frame is absent.

Aspect 93: The apparatus of any of aspects 77-92, further including: means for transmitting an indication of a directionality constraint associated with the first radio frequency link and the second radio frequency link, where the directionality constraint indicates an election by the first MLD to support uplink or downlink, or both, using the first radio frequency link and to support uplink or downlink, or both, using the second radio frequency link.

Aspect 94: The apparatus of any of aspects 77-93, where: the first MLD functions as a soft AP MLD, and the soft AP MLD uses a same set of radio frequency chains as the first MLD.

Aspect 95: The apparatus of aspect 94, further including: means for transmitting, via the first radio frequency link and using a first AP that is affiliated with the soft AP MLD, the identifying information and the control information associated with the second radio frequency link.

Aspect 96: The apparatus of any of aspects 77-95, where the first radio frequency link is a sub-7 GHz link and the second radio frequency link is a 60 GHz link or a 45 GHz link.

Aspect 97: An apparatus for wireless communications at a first MLD, including: means for transmitting, via a first radio frequency link, identifying information associated with a second radio frequency link in accordance with a multi-link operation between a second MLD and the first MLD; means for transmitting, via the first radio frequency link, control information associated with communications using the second radio frequency link, where the communications using the second radio frequency link are associated with a configuration for directional transmissions between the first MLD and the second MLD; and means for communicating, with the second MLD via the second radio frequency link, one or more data messages in accordance with the control information.

Aspect 98: The apparatus of aspect 97, where the means for transmitting the identifying information associated with the second radio frequency link include: means for transmitting, via an RNR element carried in a beacon frame or a probe response frame associated with the first radio frequency link, an indication of a restriction associated with use of the second radio frequency link; and means for transmitting, via a multi-link probe response, an indication of a condition associated with the use of the second radio frequency link, where a setup of the second radio frequency link is associated with a satisfaction of the condition.

Aspect 99: The apparatus of aspect 98, further including: means for transmitting, via the first radio frequency link, a first multi-link reconfiguration message associated with an addition of the second radio frequency link to a multi-link setup between the second MLD and the first MLD in accordance with the satisfaction of the condition; and means for transmitting, via the first radio frequency link or the second radio frequency link, a second multi-link reconfiguration message associated with a removal of the second radio frequency link from the multi-link setup between the second MLD and the first MLD in accordance with the condition no longer being satisfied.

Aspect 100: The apparatus of aspect 99, where the addition of the second radio frequency link and the removal of the second radio frequency link are specific to the second MLD.

Aspect 101: The apparatus of any of aspects 97-100, further including: means for transmitting, via the first radio frequency link, timing information corresponding to first communications using the first radio frequency link and a time domain offset between a first timing synchronization function of the first radio frequency link and a second timing synchronization function of the second radio frequency link, where a timing of the one or more data messages communicated via the second radio frequency link is associated with the timing information and the time domain offset.

Aspect 102: The apparatus of any of aspects 97-101, further including: means for receiving, via the first radio frequency link, at least one of feedback information associated with at least one of the one or more data messages communicated via the second radio frequency link, a status of a set of operating conditions associated with the second radio frequency link, an indication of changes to the set of operating conditions associated with the second radio frequency link, or a response to a query received via the second radio frequency link.

Aspect 103: The apparatus of any of aspects 97-102, where the means for transmitting the identifying information associated with the second radio frequency link include: means for transmitting at least one of a multi-link probe response frame, an association frame, or an RNR element including the identifying information.

Aspect 104: The apparatus of any of aspects 97-103, where the means for transmitting the control information associated with the communications using the second radio frequency link include: means for transmitting, via the first radio frequency link, one or more management frames including information which includes at least one of a duration of a BI, timing information, a traffic indication, information associated with a service period of the second radio frequency link, an indication of a critical update to one or more operational parameters associated with the second radio frequency link, or a set of operational parameters associated with the second radio frequency link, or any combination thereof.

Aspect 105: The apparatus of aspect 104, further including: means for transmitting, via the second radio frequency link, a beacon frame including the set of operational parameters associated with the second radio frequency link in accordance with transmitting the indication of the critical update to the one or more operational parameters associated with the second radio frequency link via the one or more beacon frames.

Aspect 106: The apparatus of any of aspects 104-105, where the one or more management frames include a beacon frame, a probe response frame, a multi-link probe response, an association response frame, or a reassociation response frame.

Aspect 107: The apparatus of any of aspects 97-106, further including: means for transmitting, via the first radio frequency link, one or more individually addressed management frames associated with the second radio frequency link.

Aspect 108: The apparatus of any of aspects 97-107, further including: means for transmitting, via the second radio frequency link, a beacon frame in accordance with a satisfaction of a condition, where the beacon frame is associated with a beam training at the second MLD.

Aspect 109: The apparatus of aspect 108, further including: means for transmitting, via the first radio frequency link, information indicating that beacon frames on the second radio frequency link are on-demand; and means for receiving, via the first radio frequency link or the second radio frequency link, a request for the beacon frame on the second radio frequency link, where the satisfaction of the condition is associated with the request for the beacon frame.

Aspect 110: The apparatus of any of aspects 108-109, where the satisfaction of the condition is associated with a topology around the second MLD, a high-mobility configuration of the second MLD, a signal strength measurement at the second MLD being below a threshold signal strength measurement, a frequency of beam training on the second radio frequency link, or an indication of a presence of the beacon frame on the second radio frequency link via a management frame transmitted on the first radio frequency link.

Aspect 111: The apparatus of any of aspects 97-107, further including: means for receiving, via the first radio frequency link, an indication of one or more ranging measurements or one or more radio frequency measurements, or both, where receiving the indication of the one or more ranging measurements or the one or more radio frequency measurements, or both, is associated with an absence of a beacon frame from the second radio frequency link.

Aspect 112: The apparatus of any of aspects 97-107 or 111, further including: means for transmitting an indication that a beacon frame is absent from a beacon interval of the second radio frequency link, where the one or more data messages are communicated during a beacon transmit interval associated with the beacon frame in accordance with the indication that the beacon frame is absent.

Aspect 113: The apparatus of any of aspects 97-112, further including: means for receiving an indication of a directionality constraint associated with the first radio frequency link and the second radio frequency link, where the directionality constraint indicates an election by the second MLD to support uplink or downlink, or both, using the first radio frequency link and to support uplink or downlink, or both, using the second radio frequency link.

Aspect 114: The apparatus of any of aspects 97-113, where the first radio frequency link is a sub-7 GHz link and the second radio frequency link is a 60 GHz link or a 45 GHz link.

Aspect 115: A non-transitory computer-readable medium storing code for wireless communications at a first MLD, the code including instructions executable by a processor to: receive, via a first radio frequency link, identifying information associated with a second radio frequency link in accordance with a multi-link operation between the first MLD and a second MLD; receive, via the first radio frequency link, control information associated with communications using the second radio frequency link, where the communications using the second radio frequency link are associated with a configuration for directional transmissions between the first MLD and the second MLD; and communicate, with the second MLD via the second radio frequency link, one or more data messages in accordance with the control information.

Aspect 116: A non-transitory computer-readable medium storing code for wireless communications at a first MLD, the code including instructions executable by a processor to: transmit, via a first radio frequency link, identifying information associated with a second radio frequency link in accordance with a multi-link operation between a second MLD and the first MLD; transmit, via the first radio frequency link, control information associated with communications using the second radio frequency link, where the communications using the second radio frequency link are associated with a configuration for directional transmissions between the first MLD and the second MLD; and communicate, with the second MLD via the second radio frequency link, one or more data messages in accordance with the control information.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A first multi-link device (MLD) for wireless communications, comprising:
 a processing system that includes one or more processors and one or more memories coupled with the one or more processors, the processing system configured to cause the first MLD to:
  obtain, via a first radio frequency link, identifying information associated with a second radio frequency link in accordance with a multi-link operation between the first MLD and a second MLD;
  obtain, via the first radio frequency link, control information associated with communications using the second radio frequency link, wherein the communications using the second radio frequency link are associated with a configuration for directional transmissions between the first MLD and the second MLD; and
  output, to the second MLD via the second radio frequency link, one or more data messages in accordance with the control information.

2. The first MLD of claim 1, wherein, to obtain the identifying information associated with the second radio frequency link, the processing system is further configured to cause the first MLD to:
 obtain, via a reduced neighbor report (RNR) element carried in a beacon frame or a probe response frame associated with the first radio frequency link, an indication of a restriction associated with use of the second radio frequency link; and
 obtain, via a multi-link probe response, an indication of a condition associated with the use of the second radio frequency link, wherein a setup of the second radio frequency link is associated with a satisfaction of the condition.

3. The first MLD of claim 2, wherein the processing system is further configured to cause the first MLD to:
 obtain, via the first radio frequency link, a first multi-link reconfiguration message associated with an addition of the second radio frequency link to a multi-link setup between the first MLD and the second MLD in accordance with the satisfaction of the condition; and
 obtain, via the first radio frequency link or the second radio frequency link, a second multi-link reconfiguration message associated with a removal of the second radio frequency link from the multi-link setup between the first MLD and the second MLD in accordance with the condition no longer being satisfied.

4. The first MLD of claim 3, wherein the addition of the second radio frequency link and the removal of the second radio frequency link are specific to the first MLD.

5. The first MLD of claim 1, wherein the processing system is further configured to cause the first MLD to:
obtain, via the first radio frequency link, timing information corresponding to first communications using the first radio frequency link and a time domain offset between a first timing synchronization function of the first radio frequency link and a second timing synchronization function of the second radio frequency link, wherein a timing of the one or more data messages output via the second radio frequency link is associated with the timing information and the time domain offset.

6. The first MLD of claim 1, wherein the processing system is further configured to cause the first MLD to:
output, via the first radio frequency link, at least one of feedback information associated with at least one of the one or more data messages output via the second radio frequency link, a status of a set of operating conditions associated with the second radio frequency link, an indication of changes to the set of operating conditions associated with the second radio frequency link, or a response to a query received via the second radio frequency link.

7. The first MLD of claim 1, wherein, to obtain the identifying information associated with the second radio frequency link, the processing system is further configured to cause the first MLD to:
obtain at least one of a multi-link probe response frame, an association frame, or a reduced neighbor report (RNR) element including the identifying information.

8. The first MLD of claim 1, wherein, to obtain the control information associated with the communications using the second radio frequency link, the processing system is further configured to cause the first MLD to:
obtain, via the first radio frequency link, one or more management frames including information which includes at least one of a duration of a beacon interval (BI), timing information, a traffic indication, information associated with a service period of the second radio frequency link, an indication of a critical update to one or more operational parameters associated with the second radio frequency link, or a set of operational parameters associated with the second radio frequency link, or any combination thereof.

9. The first MLD of claim 8, wherein the processing system is further configured to cause the first MLD to:
monitor the second radio frequency link for a beacon frame including the set of operational parameters associated with the second radio frequency link in accordance with receiving the indication of the critical update to the one or more operational parameters associated with the second radio frequency link via the one or more management frames.

10. The first MLD of claim 8, wherein the one or more management frames include a beacon frame, a probe response frame, a multi-link probe response, an association response frame, or a reassociation response frame.

11. The first MLD of claim 1, wherein the processing system is further configured to cause the first MLD to:
obtain, via the first radio frequency link, one or more individually addressed management frames associated with the second radio frequency link.

12. A first multi-link device (MLD) for wireless communications, comprising:
a processing system that includes one or more processors and one or more memories coupled with the one or more processors, the processing system configured to cause the first MLD to:
output, via a first radio frequency link, identifying information associated with a second radio frequency link in accordance with a multi-link operation between a second MLD and the first MLD;
output, via the first radio frequency link, control information associated with communications using the second radio frequency link, wherein the communications using the second radio frequency link are associated with a configuration for directional transmissions between the first MLD and the second MLD; and
obtain, from the second MLD via the second radio frequency link, one or more data messages in accordance with the control information.

13. The first MLD of claim 12, wherein, to output the identifying information associated with the second radio frequency link, the processing system is further configured to cause the first MLD to:
output, via a reduced neighbor report (RNR) element carried in a beacon frame or a probe response frame associated with the first radio frequency link, an indication of a restriction associated with use of the second radio frequency link; and
output, via a multi-link probe response, an indication of a condition associated with the use of the second radio frequency link, wherein a setup of the second radio frequency link is associated with a satisfaction of the condition.

14. The first MLD of claim 13, wherein the processing system is further configured to cause the first MLD to:
output, via the first radio frequency link, a first multi-link reconfiguration message associated with an addition of the second radio frequency link to a multi-link setup between the second MLD and the first MLD in accordance with the satisfaction of the condition; and
output, via the first radio frequency link or the second radio frequency link, a second multi-link reconfiguration message associated with a removal of the second radio frequency link from the multi-link setup between the second MLD and the first MLD in accordance with the condition no longer being satisfied.

15. The first MLD of claim 14, wherein the addition of the second radio frequency link and the removal of the second radio frequency link are specific to the second MLD.

16. The first MLD of claim 12, wherein the processing system is further configured to cause the first MLD to:
output, via the first radio frequency link, timing information corresponding to first communications using the first radio frequency link and a time domain offset between a first timing synchronization function of the first radio frequency link and a second timing synchronization function of the second radio frequency link, wherein a timing of the one or more data messages obtained via the second radio frequency link is associated with the timing information and the time domain offset.

17. The first MLD of claim 12, wherein the processing system is further configured to cause the first MLD to:
obtain, via the first radio frequency link, at least one of feedback information associated with at least one of the one or more data messages obtained via the second radio frequency link, a status of a set of operating conditions associated with the second radio frequency link, an indication of changes to the set of operating conditions associated with the second radio frequency link, or a response to a query received via the second radio frequency link.

18. A method for wireless communications at a first multi-link device (MLD), comprising:
receiving, via a first radio frequency link, identifying information associated with a second radio frequency link in accordance with a multi-link operation between the first MLD and a second MLD;
receiving, via the first radio frequency link, control information associated with communications using the second radio frequency link, wherein the communications using the second radio frequency link are associated with a configuration for directional transmissions between the first MLD and the second MLD; and
communicating, with the second MLD via the second radio frequency link, one or more data messages in accordance with the control information.

19. The method of claim 18, further comprising:
receiving, via the second radio frequency link, a beacon frame in accordance with a satisfaction of a condition, wherein the beacon frame is associated with a beam training at the first MLD.

20. The method of claim 19, further comprising:
receiving, via the first radio frequency link, information indicating that beacon frames on the second radio frequency link are on-demand; and
transmitting, via the first radio frequency link or the second radio frequency link, a request for the beacon frame on the second radio frequency link, wherein the satisfaction of the condition is associated with the request for the beacon frame.

21. The method of claim 19, wherein the satisfaction of the condition is associated with a topology around the first MLD, a high-mobility configuration of the first MLD, a signal strength measurement at the first MLD being below a threshold signal strength measurement, a frequency of beam training on the second radio frequency link, or an indication of a presence of the beacon frame on the second radio frequency link via a management frame received on the first radio frequency link.

22. The method of claim 18, further comprising:
performing one or more ranging measurements or one or more radio frequency measurements, or both, using the first radio frequency link; and
transmitting, via the first radio frequency link, an indication of the one or more ranging measurements or the one or more radio frequency measurements, or both, wherein performing the one or more ranging measurements or the one or more radio frequency measurements, or both, is associated with an absence of a beacon frame from the second radio frequency link.

23. The method of claim 18, further comprising:
receiving an indication that a beacon frame is absent from a beacon interval of the second radio frequency link, wherein the one or more data messages are communicated during a beacon transmit interval associated with the beacon frame in accordance with the indication that the beacon frame is absent.

24. The method of claim 18, further comprising:
transmitting an indication of a directionality constraint associated with the first radio frequency link and the second radio frequency link, wherein the directionality constraint indicates an election by the first MLD to support uplink or downlink, or both, using the first radio frequency link and to support uplink or downlink, or both, using the second radio frequency link.

25. The method of claim 18, wherein the first MLD functions as a soft access point (AP) MLD, wherein the soft AP MLD uses a same set of radio frequency chains as the first MLD.

26. The method of claim 25, further comprising:
transmitting, via the first radio frequency link and using a first AP that is affiliated with the soft AP MLD, the identifying information and the control information associated with the second radio frequency link.

27. A method for wireless communications at a first multi-link device (MLD), comprising:
transmitting, via a first radio frequency link, identifying information associated with a second radio frequency link in accordance with a multi-link operation between a second MLD and the first MLD;
transmitting, via the first radio frequency link, control information associated with communications using the second radio frequency link, wherein the communications using the second radio frequency link are associated with a configuration for directional transmissions between the first MLD and the second MLD; and
communicating, with the second MLD via the second radio frequency link, one or more data messages in accordance with the control information.

28. The method of claim 27, further comprising:
transmitting, via the second radio frequency link, a beacon frame in accordance with a satisfaction of a condition, wherein the beacon frame is associated with a beam training at the second MLD.

29. The method of claim 28, further comprising:
transmitting, via the first radio frequency link, information indicating that beacon frames on the second radio frequency link are on-demand; and
receiving, via the first radio frequency link or the second radio frequency link, a request for the beacon frame on the second radio frequency link, wherein the satisfaction of the condition is associated with the request for the beacon frame.

30. The method of claim 28, wherein the satisfaction of the condition is associated with a topology around the second MLD, a high-mobility configuration of the second MLD, a signal strength measurement at the second MLD being below a threshold signal strength measurement, a frequency of beam training on the second radio frequency link, or an indication of a presence of the beacon frame on the second radio frequency link via a management frame transmitted on the first radio frequency link.

* * * * *